US010013886B2

(12) United States Patent
Blomberg et al.

(10) Patent No.: US 10,013,886 B2
(45) Date of Patent: Jul. 3, 2018

(54) DRONE CARRIER

(71) Applicant: International Business Machines Corporation, Armonk, NY (US)

(72) Inventors: Jeanette L. Blomberg, Portola Valley, CA (US); Eric K. Butler, San Jose, CA (US); Anca A. Chandra, Los Gatos, CA (US); Pawan R. Chowdhary, San Jose, CA (US); Thomas D. Griffin, Campbell, CA (US); Divyesh Jadav, San Jose, CA (US); Shun Jiang, San Jose, CA (US); Sunhwan Lee, Menlo Park, CA (US); Robert J. Moore, San Jose, CA (US); Hovey R. Strong, Jr., San Jose, CA (US); Chung-hao Tan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 236 days.

(21) Appl. No.: 15/064,550

(22) Filed: Mar. 8, 2016

(65) Prior Publication Data

US 2017/0263131 A1 Sep. 14, 2017

(51) Int. Cl.
G08G 5/00 (2006.01)
B64C 39/02 (2006.01)
G05B 19/042 (2006.01)

(52) U.S. Cl.
CPC ......... *G08G 5/0034* (2013.01); *B64C 39/024* (2013.01); *G05B 19/0426* (2013.01);
(Continued)

(58) Field of Classification Search
None
See application file for complete search history.

(56) References Cited

U.S. PATENT DOCUMENTS 7,925,393 B2 4/2011 Bolt, Jr.
8,038,097 B1 10/2011 Monson et al.
(Continued)

FOREIGN PATENT DOCUMENTS

CN 203773355 U 8/2014
EP 2003057 A2 12/2008
(Continued)

OTHER PUBLICATIONS

Barnier, N. et al., "4D-Trajectory Deconfliction Through Departure Time Adjustment", Proceedings of the Eighth USA/Europe Air Traffic Management Research & Development Seminar, Jun. 2009, pp. 1-10, United States.
(Continued)

*Primary Examiner* — Shelley Chen
(74) *Attorney, Agent, or Firm* — Sherman IP LLP; Kenneth L. Sherman; Hemavathy Perumal

(57) ABSTRACT

Embodiments of the present invention provide a method comprising receiving a task set comprising multiple tasks, receiving operational information identifying one or more operating characteristics of multiple drones, and obtaining an initial heuristic ordering of the multiple tasks based on the operational information and the climate information. Each task has a corresponding task location. The method further comprises scheduling the multiple tasks to obtain a final ordering of the multiple tasks. The final ordering represents an order in which the multiple tasks are scheduled, and the final ordering may be different from the initial heuristic ordering.

20 Claims, 20 Drawing Sheets

(52) U.S. Cl.
CPC ......... *G08G 5/0013* (2013.01); *G08G 5/0026* (2013.01); *G08G 5/0039* (2013.01); *G08G 5/0043* (2013.01); *G08G 5/0056* (2013.01); *G08G 5/0069* (2013.01); *G08G 5/0082* (2013.01); *G05B 2219/23328* (2013.01)

(56) References Cited

U.S. PATENT DOCUMENTS

| | | | |
|---|---|---|---|
| 8,082,102 | B2 | 12/2011 | Ravenscroft |
| 8,164,485 | B2 | 4/2012 | Prinzel, III et al. |
| 8,234,068 | B1 | 7/2012 | Young et al. |
| 8,290,696 | B1 | 10/2012 | Sridhar et al. |
| 8,543,265 | B2 | 9/2013 | Ekhaguere et al. |
| 8,560,148 | B2 | 10/2013 | Torres |
| 8,776,074 | B1 | 7/2014 | Heisler et al. |
| 8,818,696 | B2 | 8/2014 | Klooster |
| 8,924,137 | B2 | 12/2014 | Chan |
| 8,942,914 | B2 | 1/2015 | Subbu |
| 9,014,880 | B2 | 4/2015 | Durling |
| 9,056,676 | B1* | 6/2015 | Wang ................ B64F 1/00 |
| 9,069,104 | B2 | 6/2015 | Datta et al. |
| 9,087,452 | B2 | 7/2015 | Del Pozo De Poza |
| 9,120,568 | B2 | 9/2015 | Herman et al. |
| 9,334,052 | B2* | 5/2016 | Pasko ................ B64C 39/024 |
| 9,417,070 | B1 | 8/2016 | Herriot |
| 9,513,125 | B2 | 12/2016 | Ravenscroft |
| 9,607,520 | B2 | 3/2017 | McCann et al. |
| 9,764,836 | B1* | 9/2017 | Elzinga ................ B64C 39/024 |
| 9,841,757 | B2* | 12/2017 | Mikan ................ G05D 1/0005 |
| 2006/0293840 | A1 | 12/2006 | Klein |
| 2007/0005550 | A1 | 1/2007 | Klein |
| 2008/0154486 | A1 | 6/2008 | Coulmeau |
| 2009/0050750 | A1 | 2/2009 | Goossen |
| 2010/0163621 | A1 | 7/2010 | Ben-Asher et al. |
| 2012/0143482 | A1 | 6/2012 | Goossen et al. |
| 2012/0175468 | A1 | 7/2012 | Zerof |
| 2014/0032034 | A1 | 1/2014 | Raptopoulos et al. |
| 2014/0074339 | A1* | 3/2014 | Casado ................ G05D 1/0088 701/24 |
| 2014/0222248 | A1* | 8/2014 | Levien ................ B64C 39/024 701/2 |
| 2014/0316616 | A1* | 10/2014 | Kugelmass ............ G05D 1/101 701/8 |
| 2014/0319272 | A1 | 10/2014 | Casado Magana et al. |
| 2015/0130621 | A1 | 5/2015 | Seiler |
| 2015/0181819 | A1 | 7/2015 | Celebi et al. |
| 2015/0183528 | A1 | 7/2015 | Walsh et al. |
| 2015/0246727 | A1 | 9/2015 | Masticola et al. |
| 2015/0312774 | A1* | 10/2015 | Lau ................ H04W 16/20 455/446 |
| 2016/0001883 | A1* | 1/2016 | Sanz ................ B64F 1/02 244/17.23 |
| 2016/0117933 | A1 | 4/2016 | Chan |
| 2016/0185466 | A1* | 6/2016 | Dreano, Jr. ........ G06Q 30/0635 705/26.81 |
| 2016/0216711 | A1* | 7/2016 | Srivastava ................ B64D 1/02 |
| 2016/0225263 | A1* | 8/2016 | Salentiny ............... G08G 5/003 |
| 2016/0240091 | A1 | 8/2016 | Thiele |
| 2016/0247404 | A1* | 8/2016 | Srivastava ............. G01C 21/20 |
| 2016/0257423 | A1* | 9/2016 | Martin ................ B64F 1/00 |
| 2016/0285864 | A1* | 9/2016 | Canavor ............. H04L 63/0823 |
| 2017/0045894 | A1* | 2/2017 | Canoy ................ G05D 1/101 |
| 2017/0050748 | A1 | 2/2017 | Byers et al. |
| 2017/0081026 | A1* | 3/2017 | Winn ................ G06Q 40/08 |
| 2017/0081043 | A1 | 3/2017 | Jones et al. |
| 2017/0096075 | A1 | 4/2017 | Henry et al. |
| 2017/0187993 | A1* | 6/2017 | Martch ................ B64C 39/024 |
| 2017/0203857 | A1 | 7/2017 | O'Toole |
| 2017/0316701 | A1 | 11/2017 | Gil et al. |
| 2017/0349376 | A1 | 12/2017 | Porat |

FOREIGN PATENT DOCUMENTS

| | | |
|---|---|---|
| WO | 9621208 | 7/1996 |
| WO | 2015157883 A1 | 10/2015 |

OTHER PUBLICATIONS

List of IBM Patents or Application Treated as Related.
Anonymously, "Crash controller for unmanned aerial vehicles", Dec. 2, 2014, pp. 1-4, ip.com, United States.
Anandappan, T. et al., "A Method to Secure Air to Air Messages", Feb. 23, 2015, pp. 1-7, ip.com, United States.
Anonymously, "Collision Avoidance for UAVs Using Simulated ADS-B Data", Apr. 6, 2015, pp. 1-3, ip.com, United States.
Kayayurt, B. et al., "Application of Stanag 4586 Standard for Turkish Aerospace Industries UAV Systems", Proceedings of 32nd IEEE/AIAA Digital Avionics Systems Conference (DASC), Oct. 5-10, 2013, pp. 1-7, IEEE, United States.
Closson, K., "Air Traffic Control . . . For Drones", Nov. 21, 2014, pp. 1-4, Nerac.com, United States.
Steele, B., "NASA's air traffic control system for drones is progressing nicely", Mar. 21, 2015, pp. 1-6, Excelis Inc., United States.
Simonite, T., "Air Traffic Control for Drones", Oct. 17, 2014, pp. 1-3, MIT Technology Review, United States.
DroneDeploy—Simple Fast Drone Software for Business, May 10, 2013, pp. 1-8, United States [https://www.dronedeploy.com/, originally accessed Mar. 24, 2015, downloaded on Aug. 25, 2015].
Software Patent Institute et al., "An Overview of KRL, a Knowledge Representation Language", Jul. 1, 1976, pp. 1-35, Xerox Palo Alto Research Center, IP.com, United States.
Software Patent Institute et al., "Execution Environments in Programming Languages and Operation Systems", May 31, 1982, pp. 1-179, Department of Computer Science, Carnegie-Mellon University, United States.
Control Systems Technology Group, "The Whole Drone Package System Concept", Oct. 21, 2014, pp. 1-6, Control Systems Technology Group Wiki, United States [downloaded from http://cstwiki.wtb.tue.nl/index.php?title=The_Whole_Drone_Package_System_Concept].
Sole, M. et al., "Dynamic Flight Plan Design for UAS Remote Sensing Applications", Proceedings of the 48th AIAA Aerospace Sciences Meeting Including the New Horizons Forum and Aerospace Exposition, Jan. 4-7, 2010, pp. 1-23, American Institute of Aeronautics and Astronautics, United States.
Savuran, H. et al., "Route Optimization Method for Unmanned Air Vehicle Launched from a Carrier", Lecture Notes on Software Engineering, Nov. 2015, pp. 1-6, vol. 3, No. 4, United States.
Mathew, N. et al., "Planning Paths for Package Delivery in Heterogeneous Multirobot Teams", Proceedings of the IEEE Transactions on Automation Science and Engineering, Oct. 2, 2015, pp. 1298-1308, vol. 12, No. 4, IEEE, United States.
Garone, E. et al., "Generalized traveling salesman Problem for Carrier-Vehicle Systems", Journal of Guidance, Control, and Dynamics, 2014, pp. 766-774, vol. 37, No. 3, Aerospace Research Central, United States (Abstract only).
Smith, C.Y. et al., "2025 Aerospace Replenishment: The Insidious Force Multiplier." White Papers vol. 2 Reach and Presence, Oct. 1996, pp. 1-37, Air University, United States.
Wolf, H.G., "Unmanned Aircraft Systems Integration into the National Airspace", Proceedings of the IEEE Aerospace Conference, Mar. 2-9, 2013, pp. 1-16, IEEE, United States.
Arkin, E.M. et al., "On the Reflexivity of Point Sets", Discrete and Computational Geometry, 2003, pp. 139-156, vol. 25, Springer Berlin Heidelberg, Germany.
Tech Insider, "Tokyo Police Snatch Illegal Drones Out of the Sky", Non-Military & Commercial UAS, Dec. 31, 2015, pp. 1-8, UAS Vision [downloaded from http://www.uasvision.com/2015/12/31/tokyo-police-snatch-illegal-drones-out-of-the-sky/?utm_source=Newsletter&utm_campaign=75474ff106-RSS_EMAIL_CAMPAIGN&utm_medium=email&utm_term=0_799756aeb7-75474ff106-297573481 on Feb. 23, 2016].

(56) References Cited

OTHER PUBLICATIONS

Sinha, S., "Cable plant repair via drones", Sep. 5, 2015, pp. 1-13, United States, [downloaded from https://www.cablelabs.com/wp-content/uploads/2015/04/60819-Cable_plant_repair_via_drones.pdf].

Frey, F.T., "192 Future Uses for Flying Drones", Sep. 2, 2014, pp. 1-17, Futurist Speaker, United States.

Torres, S. et al., "An Integrated Approach to Air Traffic Management to Achieve Trajectory Based Operations", Proceedings of the 2012 IEEE/AIAA 31st Digital Avionics Systems Conference (DASC), Oct. 14-18, 2012, pp. 1-35, IEEE, United States.

Mueller, E.R. et al., "4-D Operational Concepts for UAV/ATC Integration", Proceedings of the 2nd AIAA "Unmanned Unlimited" Systems, Technologies, and Operations—Aerospac, Sep. 15-18, 2003, pp. 1-11, United States.

Jardin, M.R., "Real-Time Conflict-Free Trajectory Optimization", Proceedings of the 5th USA/Europe ATM 2003 R&D Seminar, Jun. 23-27, 2003, pp. 1-10, Budapest, Hungary.

Jardin, M.R., "Grid-Based Strategic Air Traffic Conflict Detection", Proceedings of the AIAA Guidance, Navigation, and Control Conference and Exhibit, Aug. 15-18, 2005, pp. 1-11, United States.

Erzberger, H., "Automated Conflict Resolution for Air Traffic Control", Proceedings of the 25th International Congress of the Aeronautical Sciences (ICAS'06), Sep. 3-8, 2006, pp. 1-27, Hamburg, Germany.

Torres, S. et al., "An Integrated Approach to Air Traffic Management to Achieve Trajectory Based Operations", Proceedings of the 2012 IEEE/AIAA 31st Digital Avionics Systems Conference (DASC), Oct. 14-18, 2012, pp. 3E6-1-3E6-16, IEEE, United States.

Chaimatanan, S, "Strategic planning of aircraft trajectories", Ph.D. Thesis, Optimization and Control, Sep. 16, 2014, pp. 1-113, Universite Paul sabatier, France.

Gekht, D. et al., "Tactical Re-planning within the 4D Contracts ATC Concept", Proceedings of the AIAA Guidance, Navigation, and Control (GNC) Conference, Aug. 19-22, 2013, pp. 1-27, United States.

List of IBM Patents or Applications Treated as Related.

List of IBM Patents or Applications Treated as Related: filed Apr. 10, 2018, U.S. Appl. No. 15/950,026.

\* cited by examiner

DRONE CARRIER

The present invention generally relates to drone management, and more particularly, to an apparatus for deploying and landing drones from stationary and mobile platforms.

BACKGROUND

Current drone management systems of single or fleet of drones via conventional radio control protocols have multiple disadvantages. For example, there are currently no plans for general air traffic control and no way to expand existing air traffic control systems to high traffic volumes and potential traffic congestion required for many drone applications such as package pick up and delivery. State-of-the-art drones have on-board collision avoidance systems; but these systems are not designed to function in heavily congested airspace. As another example, there is currently no ubiquitous infrastructure for flight plan management for drones in multiple heterogeneous applications. Current work in this area addresses general air traffic control using human controllers with eventual automation, an approach that suffers from a scalability issue. Further, there are presently no widespread infrastructures for drone service, no services like weather forecasts suited to drone requirements, and no fail safe designs for drones to enable safe usage over populated areas.

SUMMARY

Embodiments of the present invention provide a method comprising receiving a task set comprising multiple tasks, receiving operational information identifying one or more operating characteristics of multiple drones, and obtaining an initial heuristic ordering of the multiple tasks based on the operational information and the climate information. Each task has a corresponding task location. The method further comprises scheduling the multiple tasks to obtain a final ordering of the multiple tasks. The final ordering represents an order in which the multiple tasks are scheduled, and the final ordering may be different from the initial heuristic ordering.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
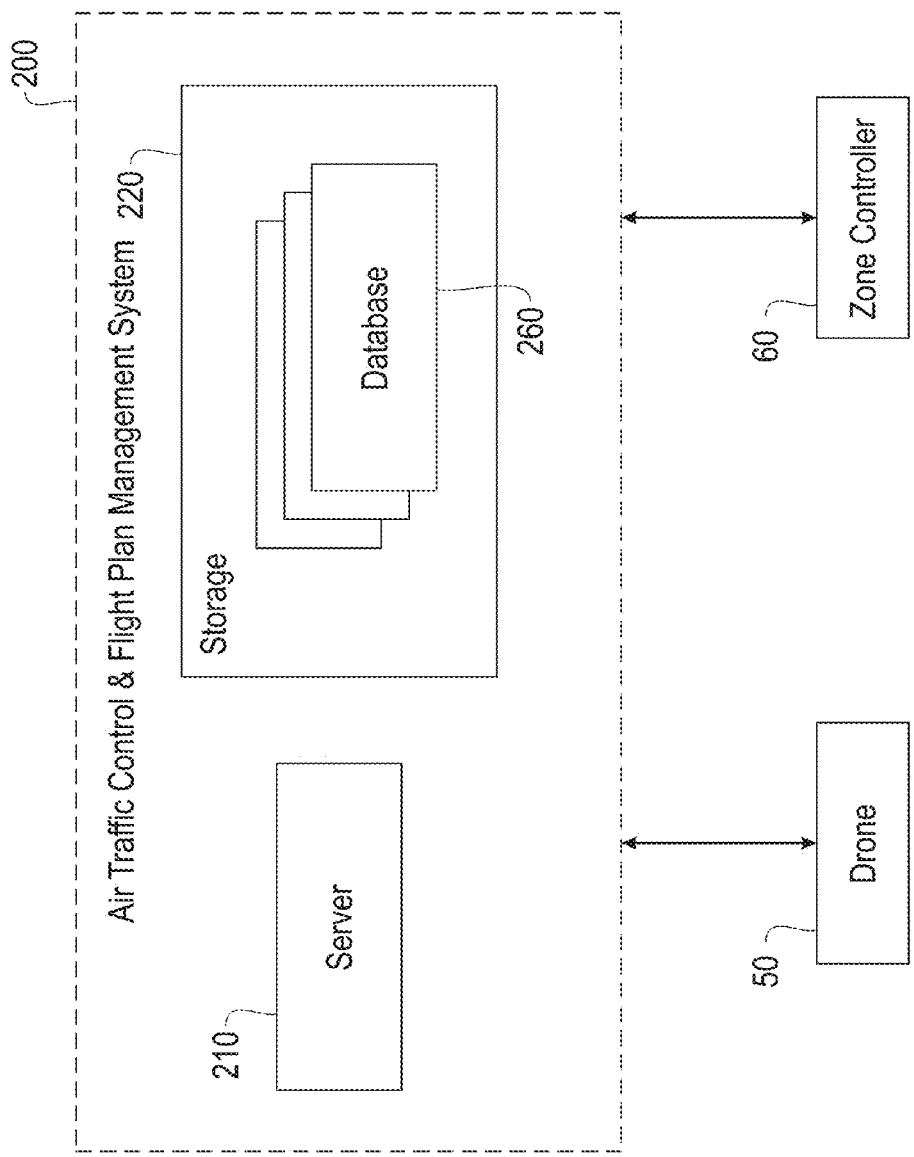
FIG. 1 illustrates an example air traffic control and flight plan management system 200, in accordance with an embodiment of the invention.

The detailed description explains the preferred embodiments of the invention, together with advantages and features, by way of example with reference to the drawings.

DETAILED DESCRIPTION

The present invention generally relates to drone management, and more particularly, to an apparatus for deploying and landing drones from stationary and mobile platforms.

Embodiments of the present invention provide a method comprising receiving a task set comprising multiple tasks, receiving operational information identifying one or more operating characteristics of multiple drones, and obtaining an initial heuristic ordering of the multiple tasks based on the operational information and the climate information. Each task has a corresponding task location. The method further comprises scheduling the multiple tasks to obtain a final ordering of the multiple tasks. The final ordering represents an order in which the multiple tasks are scheduled, and the final ordering may be different from the initial heuristic ordering.

Embodiments of the invention may utilize an existing cellular phone network as a communication medium and fundamental structure for air traffic control zones (i.e., ground zones). The fundamental structure for air traffic control zones is two-dimensional (2D), specified as intervals in longitude and latitude. Each drone has a corresponding unique identifier (e.g., a cell phone number) that may be used for communication (e.g., via text messaging). For example, each drone may communicate with its corresponding unique identifier in response to a hand-off from one cellular phone tower to another in the cellular phone network.

Embodiments of the invention provide a scalable, flexible, automated, air traffic control and flight plan management system for drones, the system configured to provide a distributed service that partitions and locks available airspace into four-dimensional (4D) cells. Each 4D cell is specified by intervals of four different dimensions. In one embodiment, the four different dimensions comprise three spatial dimensions (e.g., longitude, latitude and elevation) and one temporal dimension (e.g., time). The 4D cells have much finer granularity than any existing cellular phone network partition, thereby enabling air traffic control to be maintained via fine grained management and modification of flight plans. Air traffic control zones may share boundary cells.

Embodiments of the invention avoid congestion by locking 4D cells in air traffic control zones to ensure that different executable flight plans may not share 4D cells. In one embodiment, the air traffic control and flight plan management system is configured to receive a request for an executable flight plan for a drone, lock 4D cells in air traffic control zones exclusively for the flight plan, and return/provide the flight plan. The executable flight plan may be modified each time the drone moves from one air traffic control zone into another, thereby ensuring that the flight plan comprises best estimates for times of takeoff, landing, air traffic control zone arrival and/or air traffic control zone departure. The air traffic control and flight plan management system assumes collision avoidance is already implemented; the system provides sufficient congestion reduction, such that the situations in which avoiding collisions becomes an issue will rarely arise.

FIG. 1 illustrates an example air traffic control and flight plan management system 200, in accordance with an embodiment of the invention. The system 200 comprises one or more server devices 210, and one or more storage devices 220. The storage devices 220 may maintain one or more databases 260. The system 200 may exchange data with one or more drones 50 and/or one or more zone controllers 60 via one or more communication mediums (e.g., an existing cellular phone network). As described in detail later herein, one or more application units may execute/operate on the server devices 210 to provide a distributed service configured to partition available air-space below a pre-specified altitude and time into 4D cells, and exclusively lock one or more of the 4D cells in one or more air traffic control zones on behalf of a drone 50.

In one embodiment, the system 200 is configured to receive different types of input and provide different types of responses. For example, in response to receiving as input a request for a unique identifier for a drone 50, the system 200 assigns a unique identifier to the drone 50 and responds with the unique identifier. The unique identifier may be any type of identifier (e.g., a cell phone number). As another example, in response to receiving as input a flight plan request for a drone 50, the system 200 responds with an executable flight plan for the drone 50. As another example, in response to receiving as input a detected change in an executable flight plan for a drone 50, the system 200 responds with a new and approved executable flight plan for the drone 50. As another example, in response to receiving as input a detected failure of a drone 50, the system 200 responds with one or more required changes to one or more other executable flight plans for one or more other drones 50, and a notification that the drone 50 has gone missing near a last known location for the drone 50.

Figure 2:
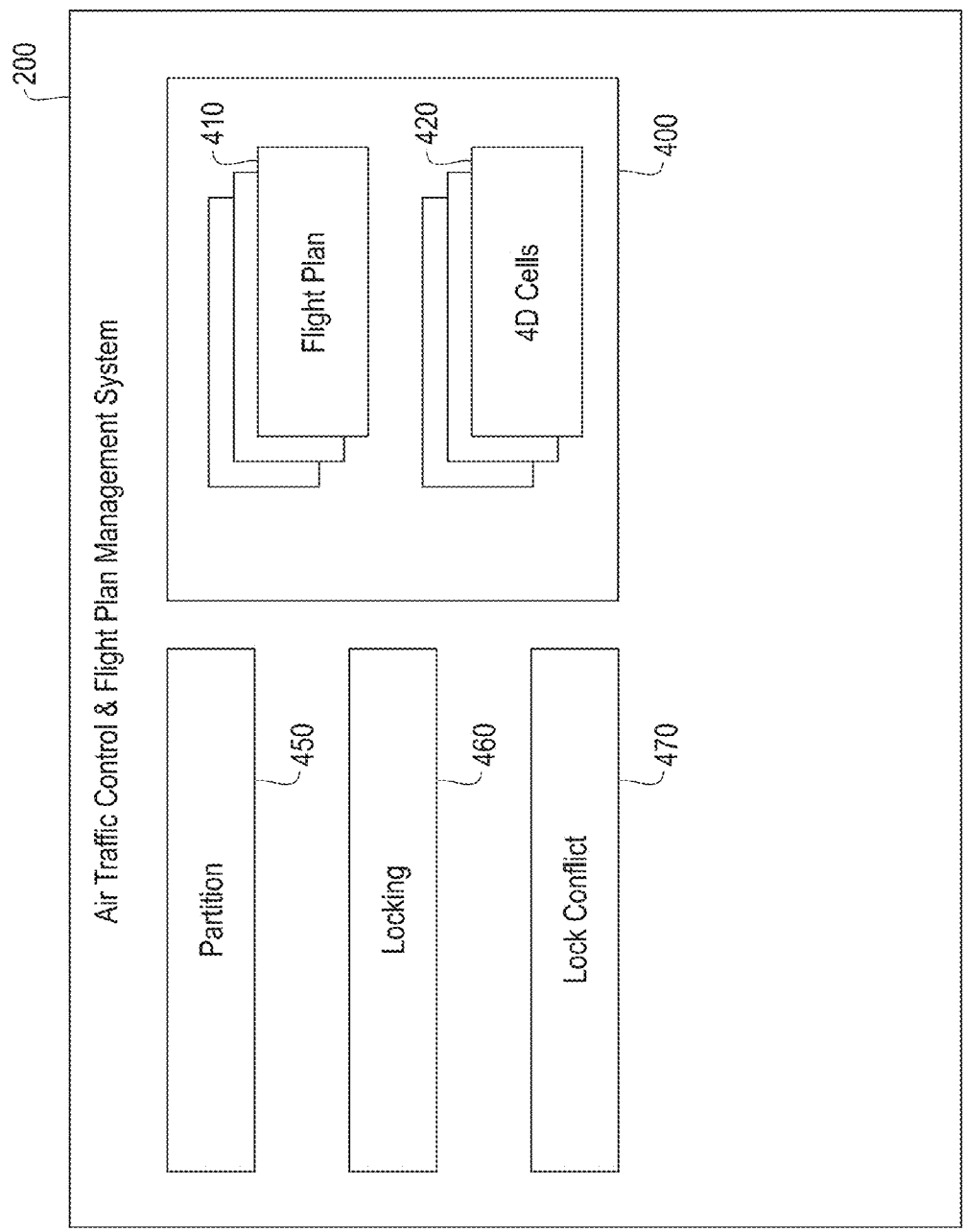
FIG. 2 illustrates the air traffic control and flight plan management system in detail, in accordance with an embodiment of the invention.

FIG. 2 illustrates the air traffic control and flight plan management system 200 in detail, in accordance with an embodiment of the invention. In one embodiment, the storage devices 220 (FIG. 1) maintain at least one database 400 maintaining a collection of executable flight plans 410, where each executable flight plan 410 corresponds to a drone 50.

The system 200 further comprises a partition module 450 configured to partition available air-space into fine grained 4D cells. In one embodiment, each 4D cell is specified by intervals of three spatial dimensions, such as longitude, latitude and elevation, and one temporal dimension, such as time. Minimum dimensions for 4D cells must satisfy the condition that each 4D cell is large enough to allow a drone to maintain its location within the 4D cell and to move vertically (i.e., change its elevation) from one 4D cell to another 4D cell immediately above or below the current 4D cell, without changing the horizontal intervals (e.g., latitude and longitude) defining the current 4D cell. Minimum dimensions for 4D cells may be based on one or more characteristics of a class of drones managed by the system 200, such as maximum horizontal speed, maximum required tolerance for position, speed, heading, etc.

In one embodiment, the at least one database 400 maintains a collection of data structures 420, where each data structure 420 corresponds to a 4D cell and includes information relating to the 4D cell (e.g., an identity of a drone 50 that has an exclusive lock on the 4D cell).

The system 200 further comprises a locking module 460 configured to exclusively lock 4D cells on behalf of a drone 50 (FIG. 1). Specifically, the system 200 may receive, as input, a flight plan request for a drone 50 either from a zone controller 60 (FIG. 1) or the drone 50. The flight plan request may include a filing of a flight plan for the drone 50 ("the initially filed flight plan"). The initially filed flight plan comprises an identity of the drone 50 (e.g., corresponding unique identifier), earliest requested flight time and/or latest desired arrival time for the drone 50, departure location for the drone 50, and one or more arrival locations for the drone 50. The locations included in the initially filed flight plan may be specified as three-dimensional (3D) coordinates. The locking module 460 constructs a modified flight plan for the drone 50 based on the initially filed flight plan. The modified flight plan is an approved and executable flight plan for the drone 50. The modified flight plan comprises the identity of the drone 50 and a planned flight path for the drone 50. The planned flight path comprises a sequence of 4D cells, such as an approved departure cell and a sequence of approved arrival cells. In one example implementation, the 4D cells represent 4D locations represented by two horizontal intervals (e.g., longitude and latitude), one vertical interval (e.g., elevation), and one time interval. An air traffic control zone or a 4D cell is on a flight path if any part of the air traffic control zone or the 4D cell is within a pre-specified distance of any point on the flight path.

As described in detail later herein, the locking module 460 applies an algorithm that exclusively locks each 4D cell included in the modified flight plan. The modified flight plan may also include additional arrival locations. The system 200 returns/provides the modified flight plan to either the zone controller 60 or the drone 50.

The locking module 460 attempts to obtain/place an exclusive lock on behalf of a drone 50 on each 4D cell included in a modified flight plan for the drone 50. In one example implementation, the locking module 460 obtains/places an exclusive lock on a 4D cell on behalf of a drone 50 by registering an identity of the drone 50 in the 4D cell. In one embodiment, each 4D cell included in the modified flight plan satisfies the following condition: some point of the 4D cell is within a pre-specified distance of a path defined by an original 2D location of the drone 50 and segments between 4D cells of the modified flight plan.

If the locking module 460 fails to obtain/place an exclusive lock on behalf of a drone 50 on a 4D cell included in a modified flight plan for the drone 50 (i.e., the 4D cell is already locked on behalf of another drone 50), the locking module 460 reroutes the modified flight plan around the 4D cell to a random adjacent/neighboring 4D cell that is to the left of, right of, above, below, or later in time than the 4D cell, from the point of view of the modified flight plan toward the 4D cell. An available set of randomly chosen adjacent/neighboring 4D cells may include "later" cells with the same 3D coordinates, where each "later" cell indicates that the drone 50 is to remain in the same 3D cell (or wait before takeoff) for one time unit, the time unit being the time duration (i.e., time interval) of the 4D cell.

In one embodiment, 4D cells at ground level are not lockable.

In one embodiment, to reroute a modified flight plan for a drone 50 around a 4D cell that is already locked on behalf of another drone 50, the locking module 460 adds a new location to a planned flight path included in the modified flight plan. The new location must satisfy the following conditions: (1) the new location is on a shared boundary between a last 4D cell locked on behalf of the drone 50 and a randomly chosen adjacent/neighboring 4D cell that is not locked, and (2) an angle between a first segment and a second segment is not obtuse, where the first segment is between the last 4D cell locked on behalf of the drone 50 and the randomly chosen adjacent/neighboring 4D cell, and the second segment is between the last 4D cell locked on behalf of the drone 50 and the 4D cell that is already locked.

In a preferred embodiment, a planned flight path for a drone 50 is kept straight. In another embodiment, a planned flight path for a drone 50 may be adjusted to minimize the number of 4D cells locked on behalf of the drone 50 by making adjustments in location to keep each successive 4D cell on the flight path unique.

In one embodiment, a planned flight path for a drone 50 may be adjusted to bias towards lower altitudes whenever the altitude is more than one vertical unit (i.e., the height of the relevant 4D cell) above the ground, thereby protecting the drone 50 from external forces that are magnified at higher altitudes, such as wind.

The system 200 further comprises a lock conflict module 470 configured to maintain a pre-determined rate of lock conflict for each air traffic control zone. 4D cells form a partition of air space below a pre-specified altitude and time; the 4D cells are organized/grouped into rectilinear 2D zones. For example, 4D cells are organized/grouped into air traffic control zones. To maintain a pre-determined rate of lock conflict for an air traffic control zone, the lock conflict module 470 may trigger the repartitioning of the air traffic control zone into more or fewer 4D cells, where the repartitioning is independent of other air traffic control zones and subject to minimum dimensions for 4D cells.

In one embodiment, the system 200 maintains a quaternary tree of hierarchical 2D zones, where the finest grained zones are of at least a minimum size required for tolerances. If a zone is a source of significant contention among multiple initially filed flight plans, the zone may be refined into four zones. In another embodiment, each 4D cell of the zone may be partitioned into multiple 4D cells. In one example implementation, to determine a sequence of 4D cells to include in a modified flight plan for a drone 50, a depth first search of a quaternary tree of hierarchical 2D zones is performed, following zones on path. At leaves of the tree, 4D cells on path are determined and an identity of the drone 50 is registered in each of the 4D cells determined, thereby exclusively locking the 4D cells on behalf of the drone 50. If an exclusive lock on a 4D cell fails to be placed/obtained, the modified flight plan is rerouted around the 4D cell and the lock conflict module 470 increments a corresponding count of lock conflicts for the zone. If a corresponding count of lock conflicts for a zone exceeds a pre-determined threshold, the lock conflict module 470 schedules 4D cells of the zone for partition. In another example implementation, optimistic concurrent breadth first search of the quaternary tree of hierarchical 2D zones is performed instead. If an exclusive lock on a 4D cell fails to be placed/obtained, rerouting around the 4D cell includes abandoning 4D cells no longer on the path.

In this specification, let the terms "lat", "long" and "elev" denote latitude, longitude and elevation, respectively.

Table 1 below provides medium level detail of example pseudo-code for an algorithm that the locking module 460 applies when locking successive 4D cells included in a modified flight plan.

TABLE 1

Input in Base State:
- Current position as 4D location (time, lat, long, elev).
- Horizontal and Vertical speed of drone (hspeed, vspeed)
- All required cells to this point locked

TABLE 1-continued

- Eight surrounding 4D locations defining convex 4D space
- At least one of eight surrounding locations on at least one cell boundary
- Target 3D position (in zone)

lockNextCell:
- If at target then return success
- For each surrounding location and each new cell on the boundary with the surrounding location
    - Lock new cell
    - If fail, then {
        undo previous move
        call reroute(cell already locked, surrounding location, boundary)
      } move:
- Move current position and rigidly move the eight surrounding locations in the direction of the target until the base state conditions above are again satisfied:
    - If at same lat and long as target then heading is in elev direction only
    - Compute rate in each dimension (time always has rate 1) from heading and speed
    - For each surrounding location:
        Compute time to next cell boundary using rate in each dimension
    - Find minimum time to next cell boundary
    - Advance current position and all surrounding points by minimum time
        Returning to base state
- Iterate through steps of the algorithm Input in Base State
Input: cell X on boundary Y with surrounding location z where locking failed
reroute:
- Select at random one of the following directions:
    - Delay (advance across time boundary if orthogonal to Y)
    - Up (if available and orthogonal to Y, advance across elevation boundary)
    - Down (if available and orthogonal to Y, advance across elevation boundary)
    - Lat (if available and toward target and orthogonal to Y, advance across lat boundary)
    - Long (if available and toward target and orthogonal to Y, advance across long boundary)
- Try lockNextCell from move with trial direction replacing old heading
- If fail, try again without replacement until pre-specified number of trials
- If success, call lockNextCell on result state
- If fail return fail Table 2 below provides fine level detail of example pseudo-code for an algorithm that the locking module 460 applies when locking successive 4D cells included in a modified flight plan. For simplicity of presentation, it is assumed that each change of 3D location in a modified flight plan is either a vertical move only or a horizontal move only, not both. Further, it is generally assumed that a modified flight plan may include simultaneous horizontal moves and vertical moves with only a slight increase in the complexity of Table 2.

TABLE 2

This level of detail assumes a binary tree for each dimension describing the intervals corresponding to cells.
In some embodiments hspeed and vspeed are functions of position based on estimated wind velocity.
Given position (pTime, pLat, pLong, pElev), the eight surrounding locations are:
1.  (pTime+timeTh, pLat, plong, pElev)
2.  (pTime−timeTh, pLat, pLong, pElev)
3.  (pTime, pLat+latTh, pLong, pElev)
4.  (pTime, pLat−latTh, pLong, pElev)
5.  (pTime, pLat, pLong+longTh, pElev)
6.  (pTime, pLat, pLong−longTh, pElev)
7.  (pTime, pLat, pLong, pElev+elevTh)
8.  (pTime, pLat, pLong, pElev−elevTh)

It is assumed that the thresholds timeTh, latTh, longTh, and elevTh are each smaller than half the minimum 4D cell defining interval in the corresponding dimension. These thresholds allow for some error in GPS location and prediction of time required to execute a part of a flight plan. If every cell touched by any of the eight surrounding locations is locked, then it follows from the size of the thresholds that every cell touched by the position of the drone is locked, provided the drone's actual position is within the thresholds of the estimated position used in the flight plan.
(upV,latV,longV) partialVelocity(position3D{ posLat,posLong,posElev}, target3D{tarLat, tarLong, tarElev}, hspeed, vspeed)
- If (tarLat == posLat&&tarLong == posLong) then {
    upV = vspeed*sign(tarElev − posElev)
    latV = 0
    longV = 0
  }

TABLE 2-continued

```
        else If tarLat == posLat then {upV = 0, latV = 0, longV = hspeed*sign(tarLong -
    posLong)}
        else If tarLong ==posLong then {upV = 0, latV = hspeed*sign(tarLat-posLat), longV =
    0}
        else {
                upV = 0
                x = (tarLat-posLat)
                y = (tarLong- posLong)
                latV = hspeed*((x/sqrt(x*x + y*y))*sign(x)
                longV = hspeed*((y/sqrt(x*x + y*y))*sign(y)
        }
nextCellBoundary(position4D{posTime, posLat, posLong, posElev}, target3D{tarLat,
tarLong, tarElev))
 ● mint = 0
 ● outputset = empty set of triples of form <surrounding location, dimension, value>
 ● For each surrounding location and each dimension:
        ○ determine partial velocity v using partialVelocity /* partial velocity in time
            dimension is always 1*/
        ○ search binary tree of dimension for interval containing the projection of
            surrounding location on dimension
                ■ a = current projection of surrounding location on dimension
                ■ (left, right) = root interval for dimension
                ■ while (left, right) has active descendants
                        if a <= (left+right)/2 then right = (left+right)/2
                        else left = (left+right)/2
                ■ interval = (left, right]
        ○ synchLock(interval) /* for multithreading */
        ○ t = current projection of surrounding location on time
        ○ if sign(v) > 0 then b = right else b = left
        ○ nt = time to next boundary = t+ (b-a)/v
        ○ if (nt< mint or mint == 0)
                        synchUnlock intervals corresponding to outputset
                        empty outputset
        ○ if (nt<= mint or mint == 0) {mint = nt, add <surrounding location, dimension,
            b> to outputset
 ● output mint, outputset
```

Table 3 below provides an example application of the algorithm in Table 2.

TABLE 3

Given:
 ● thresholds: time(1 minute), lat(0.1 mile), long(0.1 mile), elev(50 feet)
 ● 2 minute time intervals,
 ● 1 mile lat and long intervals
 ● 100 feet elevation intervals
 ● 10 mile by 10 mile by 400 feet zone
 ● position given in (minutes, miles, miles, feet) as (1, 4, 6, 150)
 ● target given in (miles, miles, feet) as (7, 10, 150)
 ● hspeed = 2 miles/minute
 ● cells locked for drone1
        ○ <(0,2],(3,4],(5,6],(100,200]>
        ○ <(0,2], (4,5], (5,6], (100, 200]>
        ○ <(0,2],(3,4], (6,7], (100,200]>
        ○ <(2,4], (3,4],(5,6],(100,200]>

The following steps are taken to produce the flight plan from this base state:
1.  the eight initial surrounding positions are
    a.  <2,4,6,150>
    b.  <0,4,6,150>
    c.  <1,4.1,6,150>
    d.  <1,3.9,6,150>
    e.  <1,4,6.1,150>
    f.  <1,4,5.9,150>
    g.  <1,4,6,200>,
    h.  <1,4,6,100>
2.  partialVelocity
    a.  latV = 1.2 miles/minute
    b.  longV = 1.6 miles/minute
    c.  elevV = 0
3.  outputset
    a.  <f,long,6>nt = 0.0625 minutes
4.  Move all surrounding points by +0.0625minutes time
    a.  <2,4,6,150>→<3.0625, 4.075, 6.1, 150>
    b.  <0,4,6,150>→<0.0625, 4.075, 6.1, 150>
    c.  <1,4.1,6,150>→<1.0625, 4.175, 6.1, 150>
    d.  <1,3.9,6,150>→<1.0625, 3.975, 6.1, 150>

TABLE 3-continued

| | | |
|---|---|---|
| | e. | <1,4,6.1,150>→<1.0625, 4.075, 6.2, 150> |
| | f. | <1,4,5.9,150>→<1.0625, 4.075, 6, 150> |
| | g. | <1,4,6,200>→<1.0625, 4.075, 6.1, 200> |
| | h. | <1,4,6,100>→<1.0625, 4.075, 6.1, 100> |
| 5. | lock new cell on boundary <(0,2],(4,5],(6,7],(100,200]> | |
| 6. | outputset | |
| | a. | <d,lat,4>nt = 0.025/1.2 = 1/48 = 0.028333.. |
| 7. | Move all surrounding points by +1/48 minutes time | |
| | a. | d →<1.090833..,4, 6.133, 150> |
| 8. | new cell on boundary <(0,2],(4,5],(6,7],(100,200]> already locked | |
| 9. | ... | |

Figure 3:
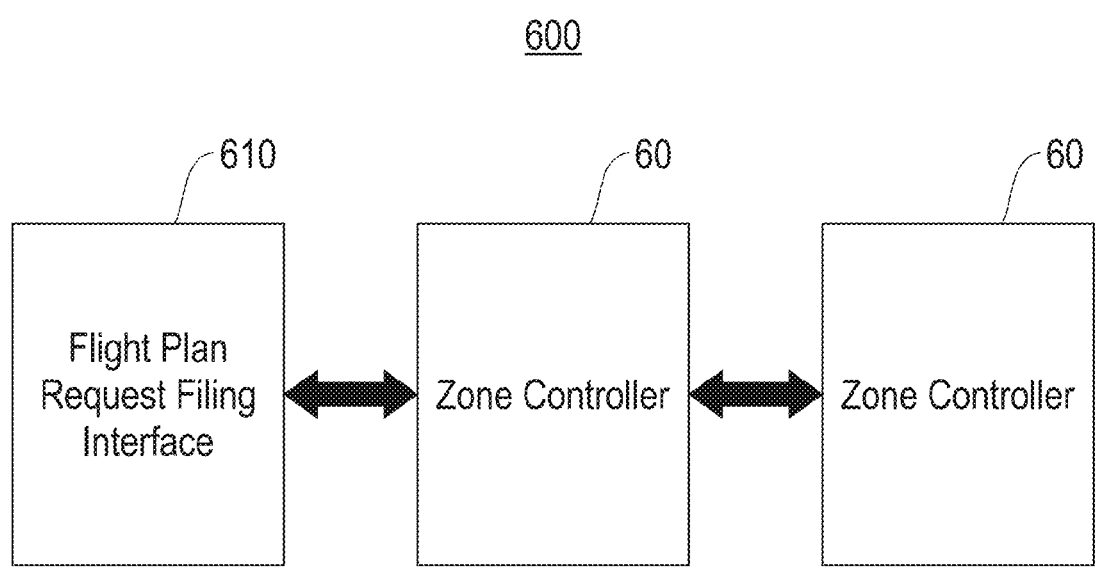
FIG. 3 illustrates an example representative architecture for a scalable, flexible, automated, air traffic control and flight plan management system for drones, in accordance with an embodiment of the invention.

FIG. 3 illustrates an example representative architecture 600 for a scalable, flexible, automated, air traffic control and flight plan management system for drones, in accordance with an embodiment of the invention. The representative architecture 600 includes a first entity 610 that provides a flight plan request filing interface. The flight plan request filing interface is configured to receive, from a drone 50 (FIG. 1), a flight plan request that includes a filing of a flight plan for the drone 50. The representative architecture 600 further includes one or more zone controllers 60, each zone controller 60 controlling air traffic for a particular air traffic control zone. The first entity 610 and the zone controllers 60 may exchange data via one or more communication mediums (e.g., a cellular phone network). The first entity 610 and each zone controller 60 may implement one or more components of the air traffic control and flight plan management system 200.

Figure 4:
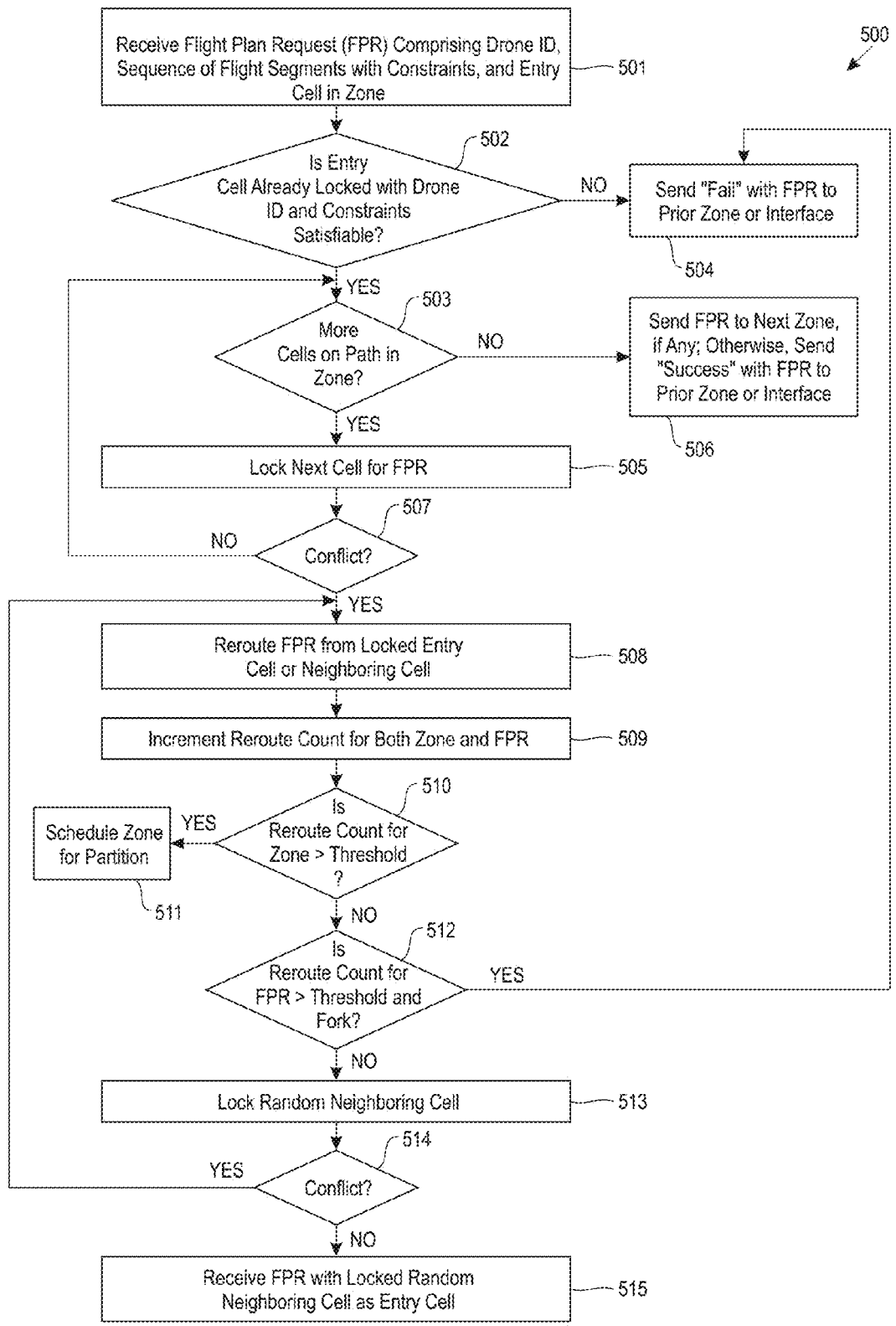
FIG. 4 illustrates a flowchart of an example process that a zone controller implements for locking successive four-dimensional (4D) cells included in a modified flight plan for a drone, in accordance with an embodiment of the present invention.

FIG. 4 illustrates a flowchart of an example process 500 that a zone controller 60 implements for locking successive 4D cells included in a modified flight plan for a drone 50, in accordance with an embodiment of the present invention. In process block 501, receive a flight plan request (FPR) comprising a unique identifier for the drone 50 ("Drone ID"), a sequence of 4D cells representing a planned flight path for the drone 50 ("sequence of flight segments with constraints"), and an entry 4D cell ("entry cell") in an air traffic control zone ("zone") that the zone controller 60 controls air traffic for. In process block 502, determine whether the entry cell is already locked with the Drone ID and the constraints are satisfiable. If the entry cell is already locked with the Drone ID and the constraints are satisfiable, proceed to process block 503. If the entry cell is not already locked with the Drone ID and/or the constraints are not satisfiable, proceed to process block 504.

In process block 504, send a "Fail" notification/message/report to a flight plan request filing interface 610 (FIG. 3) or a prior zone controller 60 controlling air traffic for a prior zone.

In process block 503, determine whether there are more 4D cells on path in the zone. If there are more 4D cells on path in the zone, proceed to process block 505. In process block 505, lock the next 4D cell for the FPR, and proceed to process block 507. If there are no more 4D cells on path in the zone, proceed to process block 506.

In process block 506, send the FPR to a next zone controller 50 controlling air traffic for a next zone, if any; otherwise, send a "Success" notification/message/report with the FPR to a flight plan request filing interface 610 or a prior zone controller 60 controlling air traffic for a prior zone.

In process block 507, determine whether there is a conflict. If there is a conflict, proceed to process block 508. If there is no conflict, return to process block 503.

In process block 508, reroute the FPR from the locked entry cell or a random neighboring 4D cell ("neighboring cell"). In process block 509, increment counters for the zone and the FPR, wherein each counter maintains a reroute count. In process block 510, determine if the reroute count for the zone exceeds a pre-determined threshold. If the reroute count for the zone exceeds a pre-determined threshold, proceed to process block 511. If the reroute count for the zone does not exceed a pre-determined threshold, proceed to process block 512.

In process block 511, schedule the zone for partition.

In process block 512, determine if the reroute count for the FPR exceeds a pre-determined threshold and fork. If the reroute count for the FPR exceeds a pre-determined threshold and fork, proceed to process block 504. If the reroute count for the FPR does not exceed a pre-determined threshold and fork, proceed to process block 513.

In process block 513, lock random neighboring cell. In process block 514, determine whether there is a conflict. If there is a conflict, proceed to process block 508. If there is no conflict, proceed to process block 515.

In process block 515, receive the FPR with the locked random neighboring cell as the entry cell.

Figure 5:
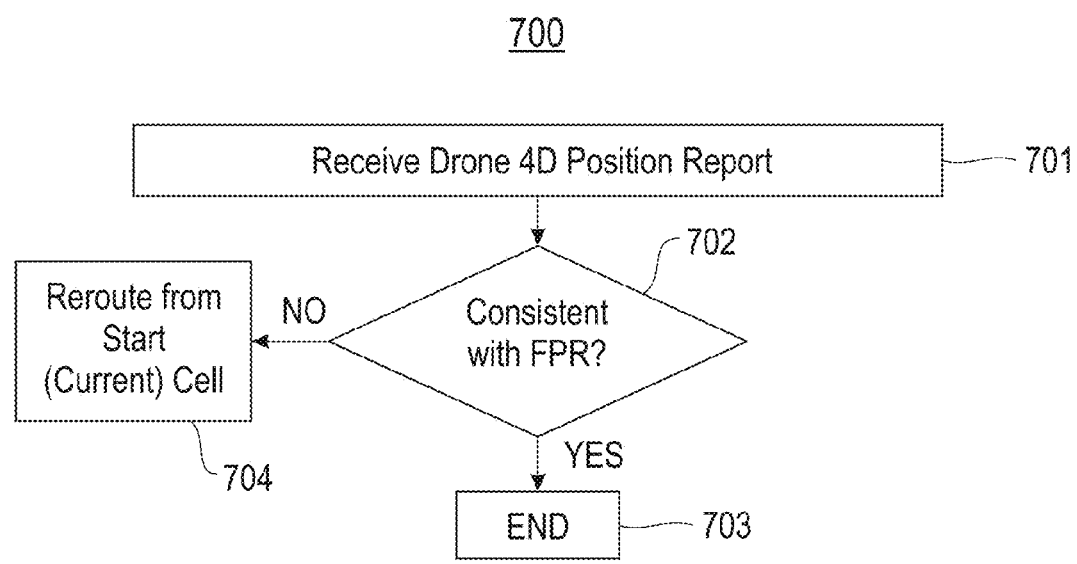
FIG. 5 illustrates a flowchart of an example process that a zone controller implements for detecting change in an executable flight plan for a drone, in accordance with an embodiment of the invention.

FIG. 5 illustrates a flowchart of an example process 700 that a zone controller 60 (FIG. 1) implements for detecting change in an executable flight plan for a drone 50 (FIG. 1), in accordance with an embodiment of the present invention. In process block 701, receive a drone 4D position report. In process block 702, determine whether the report is consistent with a FPR for the drone 50. If the report is consistent with a FPR for the drone 50, proceed to process block 703 where the process 700 ends. If the report is not consistent with a FPR for the drone 50, proceed to process block 704 where the FPR is rerouted from a start (i.e., current) 4D cell of the drone 50.

Figure 6:
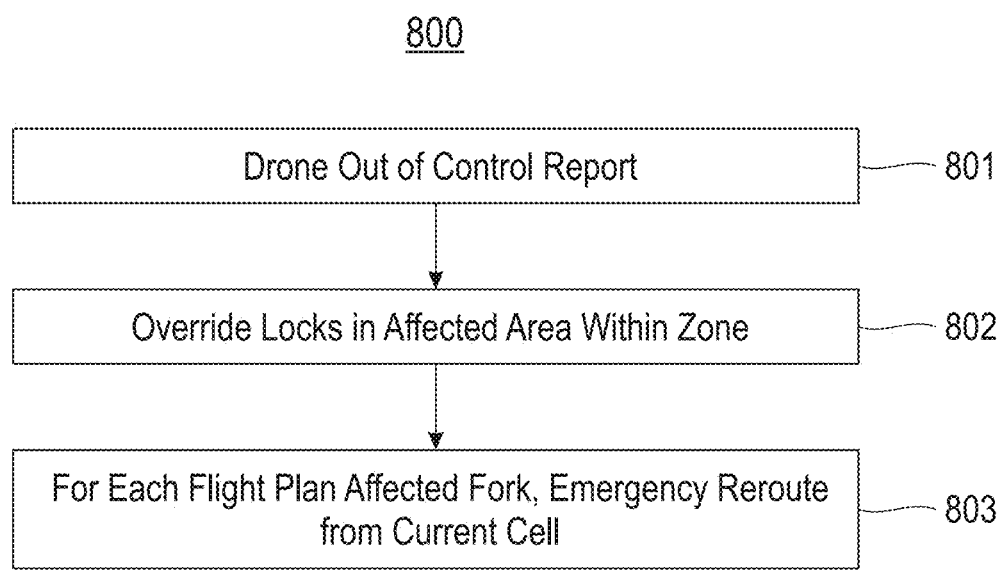
FIG. 6 illustrates a flowchart of an example process that a zone controller implements for detecting failure in execution of an executable flight plan for a drone, in accordance with an embodiment of the present invention.

FIG. 6 illustrates a flowchart of an example process 800 that a zone controller 60 (FIG. 1) implements for detecting failure in execution of an executable flight plan for a drone 50 (FIG. 1), in accordance with an embodiment of the present invention. In process block 801, receive a drone out of control report. In process block 802, override locks in affected area within air traffic control zone that the zone controller 60 controls air traffic for. In process block 803, for each flight plan affected fork, emergency reroute the FPR from a start (i.e., current) 4D cell of the drone 50.

Embodiments of the invention provide a high level programming language for execution by a drone, the high level programming language compatible with a scalable, flexible, automated, air traffic control and flight plan management system for drones. One embodiment is configured to convert a program in the high level programming language and comprising a set of specifications for a drone to either an executable flight plan or an explanation of infeasibility (e.g., a report or notification explaining why an executable flight plan for the drone is not possible).

Embodiments of the invention provide a high level programming language for designing a flight plan for a drone 50, and generating a flight plan request for the drone 50 that includes the flight plan. The high level programming language is compatible with the air traffic control and flight plan management system 200, such that the system 200 is configured to receive, as input, flight plan requests including flight plans designed using the high level programming language.

Figure 7:
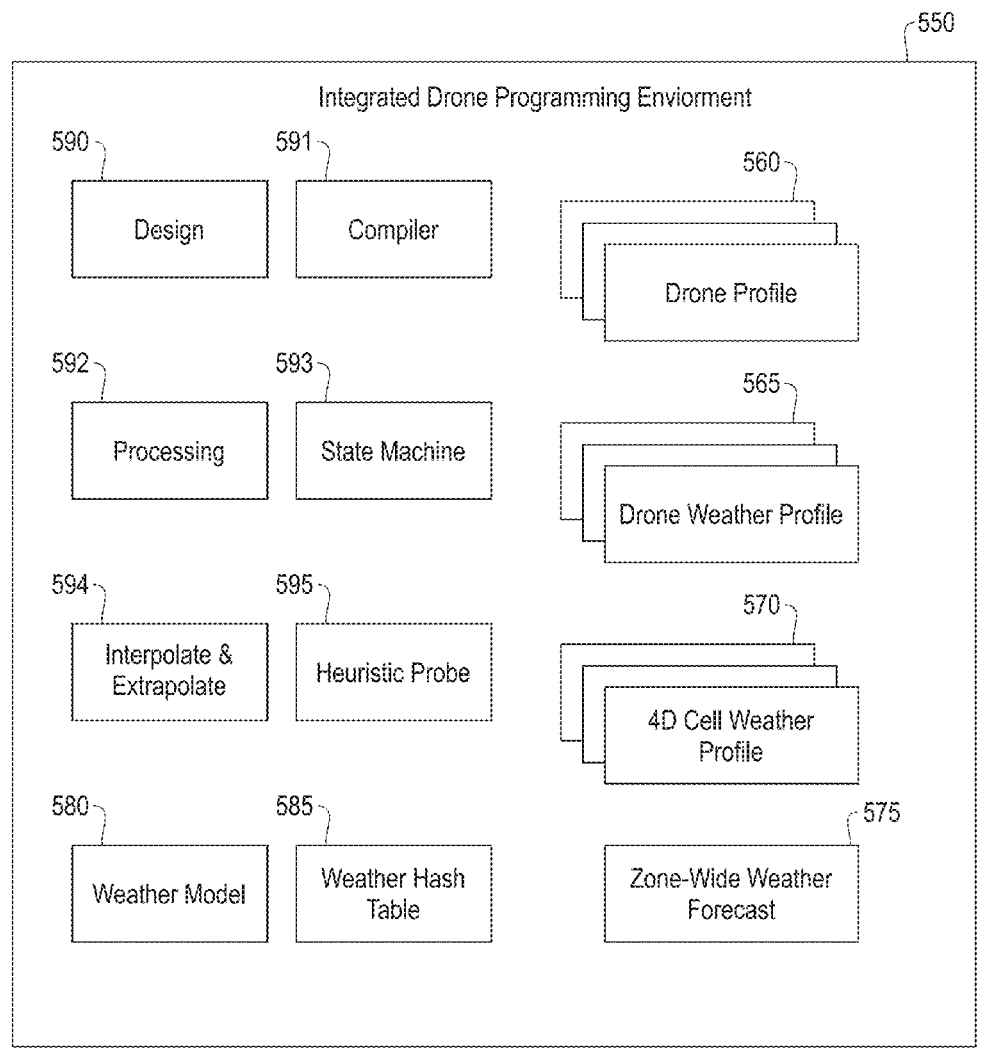
FIG. 7 illustrates an example framework for a drone programming environment, in accordance with an embodiment of the invention.

FIG. 7 illustrates an example framework 550 for a drone programming environment, in accordance with an embodiment of the invention. The framework 550 may be incorporated into the air traffic control and flight plan management system 200, or may stand alone and operate in conjunction with the system 200.

The framework 550 comprises a design unit 590 configured to design a flight plan for a drone 50 (FIG. 1) using the high level programming language, and generate a flight plan request for the drone 50 that includes the flight plan.

In one embodiment, the high level programming language comprises different high level control instructions representing actions that are understandable and describable by humans.

Table 4 below provides a listing of some example primitives and control instructions of the high level programming language.

TABLE 4

| Primitive/Control Instruction | Definition |
| --- | --- |
| Takeoff (x) | x denotes a specified elevation above ground level. Elevation x. may have multiple optional syntaxes.<br>Takeoff (x) represents an action that causes a drone to takeoff and rise up to the elevation x.<br>For simplicity and computational efficiency, we assume that drones either move vertically or horizontally and do not combine the two motions. It will be understood that allowing full 3D motion is straightforward. |
| From loc1 takeoff and rise elevchange1 feet | loc1 denotes a specified location. The location loc1 may have multiple optional syntaxes. The location loc1 is converted to latitude and longitude.<br>elevchange1 denotes a net elevation. Net elevation elevchange1 may have multiple optional syntaxes.<br>From loc1 takeoff and rise elevchange1 feet represents an action that causes a drone to takeoff from location loc1 and rise up by the net elevation elevchange1 in feet.<br>The drone will take off and move vertically (maintaining its latitude and longitude within the latitude and longitude intervals describing its original 4D cell) until it has reached the desired elevation above the ground; it will then execute a next command that may involve horizontal motion. |
| Land (y)<br>or<br>Land ( ) | y denotes an optional specified beacon. The beacon y may have multiple optional syntaxes.<br>If the beacon is stationary, y may optionally be converted to latitude and longitude; the alternative is a specific operation of iterative estimation of a target latitude and longitude followed by a change of altitude and then a change of heading. The latter alternative is necessary if y is mobile. A mobile landing beacon is the subject of two additional invention disclosures. For this specification, we can assume that the beacon is stationary.<br>Land (y) represents an action that causes a drone to land at the beacon y.<br>Land ( ) represents an action that causes a drone to land at a current latitude and longitude. |
| From loc2 land at beacon2 | loc2 denotes a specified location. The location loc2 may have multiple optional syntaxes. The location loc2 is converted to latitude and longitude.<br>beacon2 denotes a specified beacon. The beacon beacon2 may have multiple optional syntaxes.<br>From loc2 land at beacon2 represents an action that causes a drone at location loc2 to land at the beacon beacon2. |
| From loc1 proceed to loc2 | loc1 denotes a first location, and loc2 denotes a second location. The locations loc1 and loc2 may have multiple optional syntaxes. Each location is converted to latitude and longitude.<br>From loc1 proceed to loc2 represents an action that causes a drone to move from loc1 to loc2. |
| Move horizontal from location1 to location2 | location1 denotes a first location, and location2 denotes a second location. The locations location1 and location2 may have multiple optional syntaxes. Each location is converted to latitude and longitude.<br>Move horizontal from location1 to location2 represents an action that causes a drone to move horizontally only from the first location location1 to the second location location2 while maintaining a current elevation above ground level. |
| Move vertical from elevation1 to elevation2 | elevation1 denotes a first elevation, and elevation2 denotes a second elevation. Elevations elevation1 and elevation2 may have multiple optional syntaxes that are converted to net elevation in units (e.g., feet, meters, etc.) above ground level.<br>Move vertical from elevation1 to elevation2 represents an action that causes a drone to move vertically from the first |

TABLE 4-continued

| Primitive/Control Instruction | Definition |
|---|---|
| | elevation elevation1 to the second elevation elevation2 while maintaining a current latitude and longitude. |
| G or Grasp package | G or Grasp package represents an action that causes a drone to grasp a payload or package (e.g., an object for delivery) |
| R or Release package | R or Release package represents an action that causes a drone to release a payload or package (e.g., an object for delivery) |
| C (z) | z denotes a custom, user-defined action (e.g., turn on/off spray). C (z) represents an action that causes a drone to execute the custom, user-defined action z. |
| Complete by (t) | t denotes a real-time deadline by which a flight plan for a drone must be completed. Complete by (t) is an optional primitive that may be used to determine timing feasibility of a flight plan for a drone. |

In this specification, let the term "program" denote a flight plan for a drone 50 that is designed using the high level programming language. A program comprises at least one sequence of at least one instance of at least one primitive and/or control instruction of the high level programming language. The program represents operating specifications for a drone 50 that may include one or more interpretations of one or more custom, user-defined actions for the drone 50 to execute.

Table 5 below provides an example program for a drone 50.

TABLE 5

```
from loc1 takeoff and rise elevchange1 feet
from loc1 proceed to loc2
from loc2 land at beacon2
grasp package
from loc2 takeoff and rise elevchange2 feet
from loc2 proceed to loc1
from loc1 land at beacon1
release package
```

The program in Table 5 comprises a sequence of control instructions that, when an executable flight plan (comprising a sequence of 4D cells, see Table 6) is returned and executed, cause a drone 50 to operate as follows: (1) takeoff from location loc1 and rise up by net elevation elevchange1 in feet, (2) move from location loc1 to location loc2, (3) from location loc2, land at beacon beacon2, (4) grasp package at beacon beacon2, (5) takeoff from location loc2 and rise by net elevation elevchange2 in feet, (6) move from location loc2 to location loc1, (7) from location loc1, land at beacon beacon1, and (8) release the package at beacon beacon1.

In one embodiment, a program is initially checked for consistency against a state machine 593. In another embodiment, a program may omit one or more specified locations and/or elevations that are automatically filled in/provided by the state machine 593 based on an initial location and elevation.

The framework 550 further comprises a compiler 591 for compiling a program into a flight plan request that takes into account one or more of the following factors: horizontal and vertical speeds, reported wind speeds, weather, temporary obstacles, etc. The flight plan request is forwarded to the system 200 to obtain an executable flight plan with exclusive locks on 4D cells in air traffic control zones touched by the flight plan.

The framework 550 maintains a collection of drone profiles 560. Each drone profile corresponds to a drone 50, and maintains one or more of the following pieces of information relating to the drone 50: useful battery time (the battery time may account for a user-specified cushion), battery life as a function of recharge time at any planned recharge facility, horizontal air speed (assuming no wind speed, gusts, etc.), vertical climb speed (assuming no wind speed, gusts, thermals, etc.), vertical descent speed (assuming no wind speed, gusts, thermals, etc.), number of rotors, and an Application Programming Interface (API) specific to the drone 50.

The framework 550 further maintains a collection of drone weather profiles 565. Each drone weather profile 565 corresponds to a drone 50, and maintains one or more of the following information relating to effects of different weather conditions on the drone 50: estimated effect of horizontal wind gust on various drone speeds, estimated effect of prevailing horizontal wind on drone speeds, estimated effect of up draft on various drone speeds, estimated effect of down draft on various drone speeds, estimated effect of steady up wind on various drone speeds, and estimated effect of steady down wind on various drone speeds.

The framework 550 is configured to receive and maintain zone-wide weather forecast information 575 for an air traffic control zone. The zone-wide weather forecast information 575 includes wind velocity and intensity (e.g., maximum amplitude and direction of gusts) for the air traffic control zone. The framework 550 further maintains a weather model 580 for the air traffic control zone. The weather model 580 is based on observations on the weather conditions of the air traffic control zone (e.g., the zone-wide weather forecast information 575), and is used to predict how wind conditions may change with elevation, horizontally in each direction, and daily/seasonally with time.

The framework 550 further comprises an interpolate and extrapolate unit 594 configured to interpolate in space and extrapolate in time weather conditions at any 4D cell within an air traffic control zone that is on a flight path for a drone 50. Specifically, when a flight plan calls for a drone 50 with a corresponding drone profile 560 to use the air traffic control zone, the interpolate and extrapolate unit 594 determines, based on the drone profile 560, a sequence of time-stamped GPS coordinates representing a flight path of the drone 50 within the zone, by inferring weather conditions at each 4D cell on the flight path. For example, the interpolate and extrapolate unit 594 is configured to extrapolate in time wind conditions at any 4D cell on the flight path based on the weather model 580. As another example, the interpolate and extrapolate unit 594 is configured to interpolate in space wind conditions at any 4D cell on the flight path based on a latitude or longitude line through the 4D cell and between two nearby 4D cells within the zone based on independent observations of wind conditions at the two/nearby 4D cells, or based on one independent observation and one prediction from the weather model 580, or based on two predictions from the weather model 580. The ability to interpolate in space and extrapolate in time weather conditions at any 4D cell on a flight path for a drone 50 removes the need to predict weather conditions for all 4D cells within the air traffic control zone (i.e., weather conditions for unused 4D cells that are not on the flight path may be ignored).

The framework 550 further maintains a collection of 4D cell weather profiles 570. Each 4D cell weather profile 570 corresponds to a 4D cell within an air traffic control zone, and maintains information relating to wind conditions at the 4D cell, such as estimated prevailing (net) wind direction and speed, and estimated gust intensity direction and frequency. As described above, the wind conditions at a 4D cell may be interpolated in space and extrapolated in time based on the weather model 580 and/or independent observations of wind conditions at nearby 4D cells.

The framework 550 further comprises a processing unit 592 configured to determine overall feasibility of a program. Determining the overall feasibility of a program takes place within the system 200 where locks are obtained. The system 200 determines which locks to obtain, taking into account weather conditions likely to be encountered to predict which 4D cells need to be locked. The method of constructing the flight plan and obtaining locks is extended to include horizontal and vertical speeds for the drone that depend on the 4D cell in which the drone will move. For each action (i.e., control instruction) included in the program, the processing unit 592 estimates a speed at which the action will be performed at based on horizontal and vertical speeds that depend on reported wind speeds, weather conditions, temporary obstacles, etc. The system 200 is utilized to obtain exclusive locks for 4D cells on the flight plan constructed for the drone 50, and to generate and return an executable flight plan including a time window for initial takeoff of the drone 50. Before an executable flight plan is returned, if the processing unit 592 detects a failure at any stage of the program, a report including an explanation of infeasibility is generated and returned instead (i.e., each failure detected is reported in detail), and any 4D cell locked on behalf of the drone 50 is released.

The processing unit 592 is configured to detect different types of failures. For example, the processing unit 592 is configured to predict, for each maximum segment of a flight plan for a drone 50, a worst case time by which the drone 50 must reach a 4D cell located at an end of the segment without recharging a battery of the drone 50. If the worst case time predicted exceeds useful battery time for the drone 50, the processing unit 592 flags this as a detected failure and returns a report including an explanation of infeasibility. As another example, the processing unit 592 is configured to determine whether weather conditions exceed conditions for controlled flight or whether there is a severe weather warning for part of a flight plan for a drone 50. If weather conditions exceed conditions for controlled flight or there is a severe weather warning for part of a flight plan for a drone 50, the processing unit 592 flags this as a detected failure and returns a report including an explanation of infeasibility. If an executable flight plan is returned and there is a chance that weather conditions will worsen, the plan may include one or more contingency landing points where the drone 50 may seek shelter.

The framework 550 further comprises a heuristic probe unit 595 configured to heuristically probe for observed weather conditions near a newly requested 4D cell. The framework 550 maintains a weather hash table 585 associated with a latitude binary tree, a longitude binary tree, and an elevation binary tree. Each hash entry includes an observed weather condition and a corresponding time stamp. Each hash entry has a corresponding hash key specified in intervals of longitude, latitude and elevation. A newer observed weather condition overwrites an older observed weather condition. Observed weather conditions that are older than a specified time are deleted from the weather hash table 585.

Each leaf entry in each binary tree (i.e., latitude binary tree, a longitude binary tree, and an elevation binary tree) maintains a first list of hash keys for hash entries including observed weather conditions (at 3D cells) and a second list of hash keys for locks placed (on 4D cells). When two leaf entries of a binary tree are merged, an average of observed weather conditions is maintained for the merged leaf entry if both leaf entries have observations with the same time stamp; otherwise, the more recent observed weather condition survives.

In response to a request to heuristically probe for observed weather conditions near a newly requested 4D cell, the heuristic probe unit 595 is configured to determine a latitude or longitude direction that is most orthogonal to a direction of a requested flight plan. If a latitude direction is most orthogonal to a direction of a requested flight plan, an entry corresponding to the newly requested 4D cell is located in the latitude binary tree, and the closest observed weather conditions are used, if any. If a longitude direction is most orthogonal to a direction of a requested flight plan, an entry corresponding to the newly requested 4D cell is located in the longitude binary tree, and the closest observed weather conditions are used, if any. If observed weather conditions on opposite sides of the newly requested 4D cell are available at any distance from the newly requested 4D cell weather conditions for the newly requested 4D cell are interpolated in space using the interpolate and extrapolate unit 594 based on the closest observed weather conditions on each side. If no observed weather conditions are found, the zone-wide weather forecast information 575 is extrapolated in time using the interpolate and extrapolate unit 594.

Embodiments of the invention provide a drone adaptor configured to adapt an executable flight plan for a drone 50 to drone specific API 650 (FIG. 8) for the drone 50. In one embodiment, the drone adaptor is an onboard drone adaptor comprising a computer on a chip on the drone 50. In another embodiment, the drone adaptor is a remote adaptor implementing synchronous radio translation using a compute thread on a server 680 (FIG. 9) of a zone controller 60.

Figure 8:
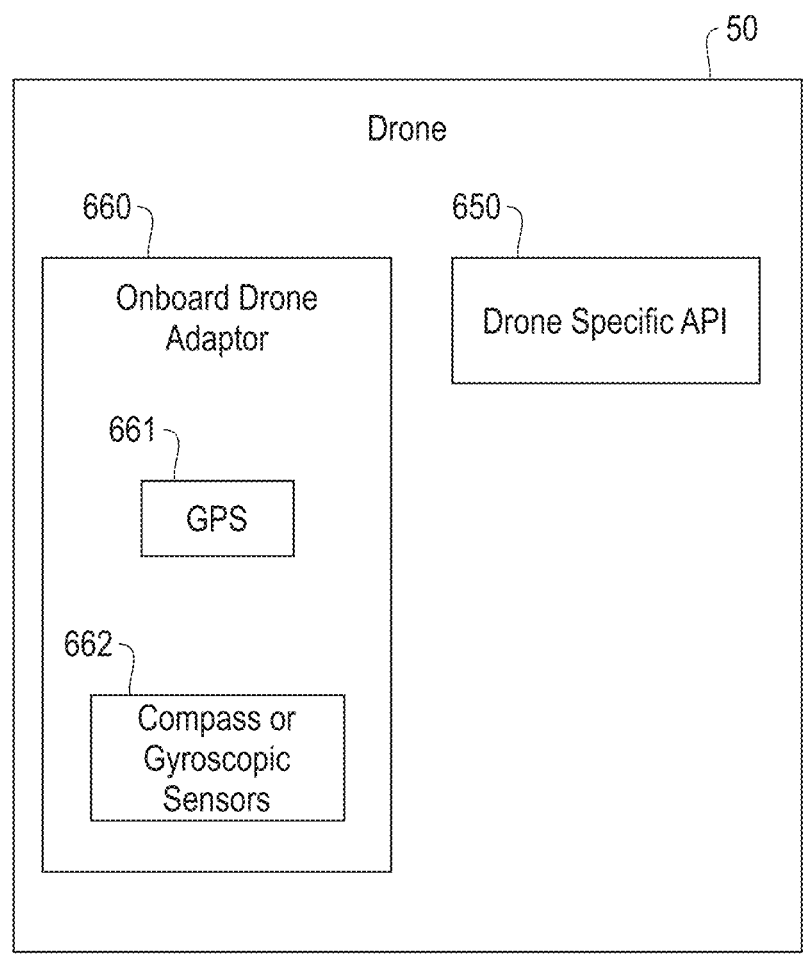
FIG. 8 illustrates an example onboard drone adaptor on a drone, in accordance with one embodiment of the invention.

FIG. 8 illustrates an example onboard drone adaptor 660 on a drone 50, in accordance with one embodiment of the invention. The onboard drone adaptor 660 is configured to convert high level time and location sensitive commands in the high level programming language to commands for a drone specific API 650 that lacks time and/or location sensitivity. The onboard drone adaptor 660 comprises a GPS unit 661 for enabling time and location sensitivity. The onboard drone adaptor 660 further comprises compass or gyroscopic sensors 662 for enabling orientation sensitivity to select a specific heading (i.e., direction of travel) on drones that have no built-in compass or other orientation device.

Figure 9:
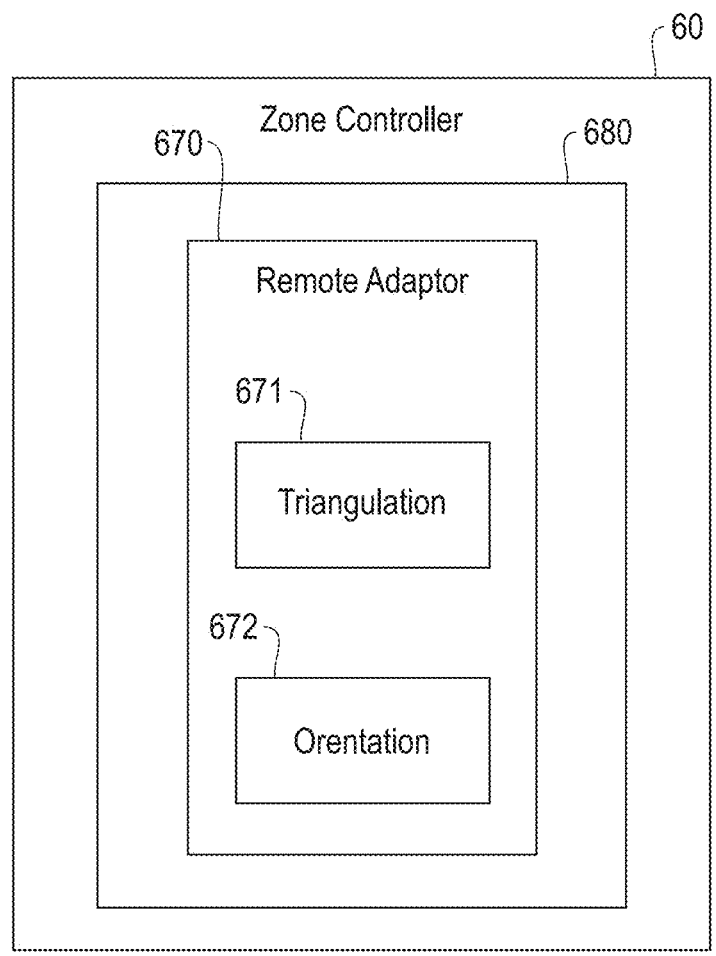
FIG. 9 illustrates an example remote adaptor on a server of a zone controller, in accordance with one embodiment of the invention.

FIG. 9 illustrates an example remote adaptor 670 on a server 680 of a zone controller 60, in accordance with one embodiment of the invention. The remote adaptor 670 is configured to convert high level time and location sensitive commands in the high programming language to commands for a drone specific API 650 (FIG. 8) that lacks time and/or location sensitivity. The remote adaptor 670 comprises a triangulation unit 671 configured to obtain location information for a drone 50 using triangulation from cell towers in or near an air traffic control zone controlled by the zone controller 60, thereby enabling time and location sensitivity. The remote adaptor 670 further comprises an orientation unit 672 for inferring an orientation of the drone 50 based on observed flight of the drone 50, thereby enabling orientation sensitivity.

Both the onboard drone adaptor 660 (FIG. 8) and the remote adaptor 670 are configured to provide commands to the drone specific API 650. The commands provided to the drone specific API 650 may include low level commands addressing servos at individual rotors of the drone 50, such as low level commands that increase or decrease rotational speed, or change orientation of the rotors, with respect to a chassis of the drone 50. Both the onboard drone adaptor 660 and the remote adaptor 670 are configured to convert high level commands of an executable flight plan to middle level command; the middle level commands are in turn converted to low level commands for the drone specific API 650.

Table 6 below provides some example high level commands of executable code for the example program in Table 5.

TABLE 6

Cell(latival1, longival1, elevival1, timeival1)
Cell(latival1, longival1, elevival2, timeival2)
Cell(latival2, longival2, elevival2, timeival3)
Cell(latival2, longival2, elevival3, timeival4)
Land(beacon2)
...

Table 7 below provides example middle level commands converted from example high level commands.

TABLE 7

Time(timeival1[1]) → Up full power
Elev(elevival2[1]) → Hover;
Heading head(latival2−latival1,longival2−longival1), Forward full power Embodiments of the invention provide a data structure to support a variably partitioned multi-dimensional space, where some cells of the space include transient data. One embodiment provides a data structure that supports the air traffic control and flight plan management system 200. The data structure allows fast access to cells in a variably partitioned multi-dimensional space that are within proximity to a given path in the space. The data structure also allows local repartitioning in parts of the space that are accessed frequently. The data structure takes advantage of the transient and sparse nature of data included in the space.

One embodiment implements adaptive management and modification of flight plans to maintain air traffic control for an air traffic control zone by partitioning a map of available air space within the zone into multiple 4D cell structures with dynamically changing granularity. The 4D cell structures may be subdivided (i.e., locally repartitioned) or merged (i.e., locally merged) to reduce traffic congestion while minimizing required compute power. Each 4D cell structure has a density that varies in each dimension (spatial and temporal) based on volume of local traffic and frequency of conflicts within the zone. For example, in areas of high conflict, 4D cell structures within the areas may be refined via local repartitioning, one dimension at a time as needed. As another example, in areas where frequency of conflicts is reduced, 4D cell structures may be locally merged, one dimension at a time as needed. To preserve a required lack of conflicts in individual 4D cell structures, a local merger may take place at a scheduled time after a last active time.

Figure 10:
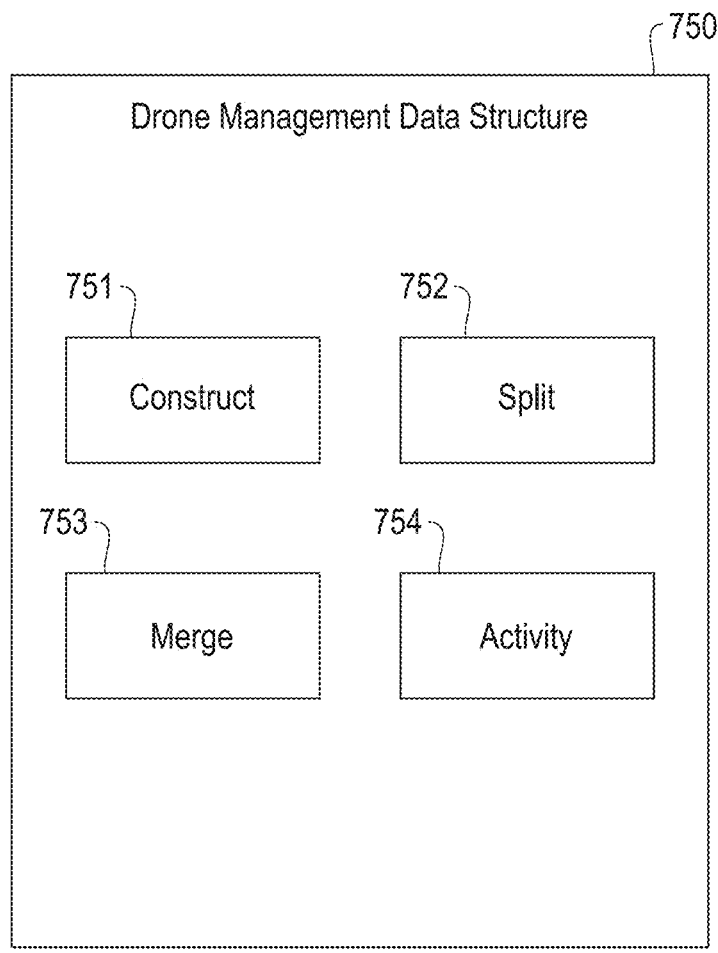
FIG. 10 illustrates an example drone management data structure system, in accordance with an embodiment of the invention.

FIG. 10 illustrates an example drone management data structure system 750, in accordance with an embodiment of the invention. The system 750 may be incorporated into the air traffic control and flight plan management system 200, or may stand alone and operate in conjunction with the air traffic control and flight plan management system 200.

Figure 11:
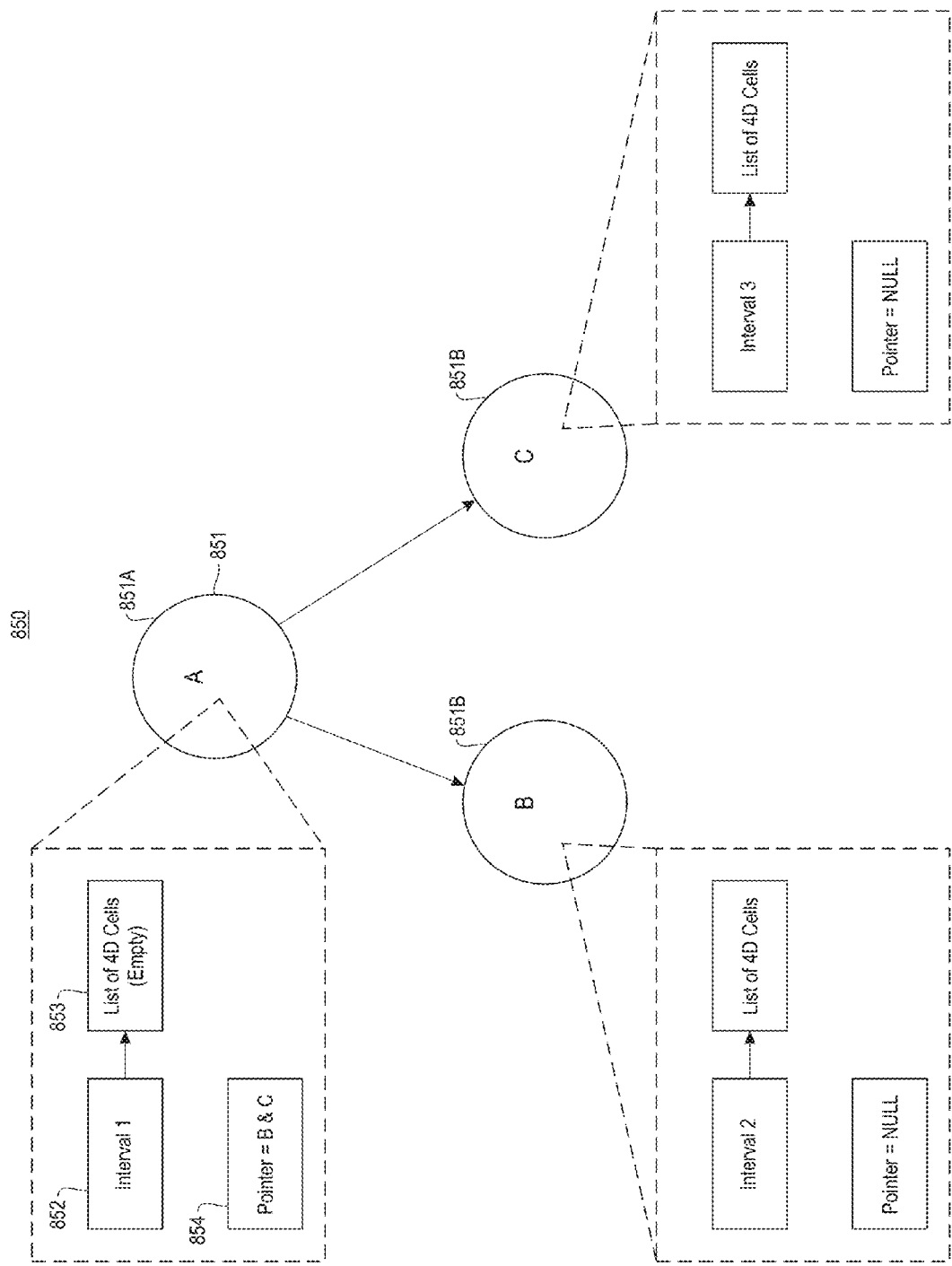
FIG. 11 illustrates an example tree data structure, in accordance with an embodiment of the invention.

The system 750 comprises a construct unit 751 configured to construct a tree data structure 850 (FIG. 11) for each dimension of a variably partitioned multi-dimensional space. Each tree data structure 850 comprises one or more nodes 851 (FIG. 11). A node 851 may be either a parent node 851A (FIG. 11) or a leaf node 851B (FIG. 11). As described in detail later herein, each node 851 in a tree corresponding to dimension D is defined by an interval in dimension D 852 (FIG. 11) and each leaf node maintains a list 853 (FIG. 11) of 4D cells with transient unexpired data.

In one embodiment, the tree data structure 850 may be a binary tree. In another embodiment, the tree data structure 850 may be another tree data structure type, such as a ternary tree. When not specified we assume for simplicity that the trees are binary trees. The conversion of the descriptions below to apply to ternary or other tree data structure types is straightforward.

As stated above, in one embodiment, available air-space within an air traffic control zone is partitioned into multiple 4D cells, wherein each 4D cell is specified by intervals of three spatial dimensions (i.e., longitude, latitude and elevation) and one temporal dimension (i.e., time). The construct unit 751 is configured to construct a first tree data structure 850 for the latitude dimension, a second tree data structure 850 for the longitude dimension, a third tree data structure 850 for the elevation dimension, and a fourth tree data structure 850 for time.

Four binary trees corresponding to three spatial dimensions and one temporal dimension are sufficient to maintain the locks on 4D cells required by our system for drone air traffic control. The root node in the latitude binary tree is a latitude interval that covers the air traffic control zone latitudes. The root node in the longitude binary tree is a longitude interval that covers the air traffic control zone longitudes. The root node in the elevation binary tree is an elevation interval that covers the air traffic control zone elevations (with ground level always regarded as zero elevation). The root node in the temporal binary tree is an interval of time sufficient to cover the remaining time in all current flight plans. This interval can be expanded and changed as needed and may exceed 24 hours. The other roots are fixed and reflect the dimensions of the zone, which is assumed to be a rectangular solid (3D figure). For the purpose of recording locks on 4D cells, a 4D hash table is constructed. When a lock is set, the hash key is the concatenation of the set of four intervals (in a specified order) that describe the 4D cell. The hash key and the identity of the lock are placed in the hash table as a key, value pair. Each binary tree leaf points to a list of hash keys for all locked 4D cells. When an interval of time describing a 4D cell has expired, any corresponding entry in the hash table has expired. Thus all data in the 4D hash table is transient. Garbage collection removes the hash key from any binary tree leaf list and removes the entry from the hash table.

The three spatial binary trees described above may also be used to record transient-weather observation information, each piece of information comprising a time stamp and a 3D cell. For this purpose, a 3D hash table is constructed, the hash key consisting of the concatenation of the three spatial intervals describing a 3D cell (in a specified order). The value corresponding to the hash key comprises a time stamp and details of a weather observation in the corresponding 3D cell. When a time stamp has aged beyond a pre-specified time, it is deemed to have expired and the corresponding entry in the 3D hash table may be garbage collected, as above.

When a leaf node in a binary tree is split, the corresponding interval is split in half, each half becoming the interval for a new leaf node. All the entries in the list of hash keys of the parent node must be changed to two entries, one for each new leaf. Entries corresponding to the parent must be garbage collected after their corresponding values have been placed in the hash table for each of the two keys.

When two leaf nodes with the same parent are to be merged, the 4D case requires that the merger wait until the old data at the leaves has expired while accumulating any new data at the parent. The merger in the 3D case is simpler. If there is no conflict the value is promoted to the parent. In a conflict the newer timestamp wins and ties are averaged. In all cases keys must be modified to reflect the new binary tree structure.

In another embodiment, the 3D case and the 4D case may be kept separate with independent sets of 3 and 4 binary trees, respectively The system 750 further comprises an activity unit 754 configured to maintain a measure of activity for each leaf node 851B of each tree data structure 850 constructed.

When a measure of activity for a leaf node 851B of a tree data structure 850 exceeds a pre-specified high threshold, the leaf node 851B is split (i.e., locally repartitioned) into n leaf nodes utilizing a split unit 752 of the system 750, wherein n is based on the tree data structure type of the tree data structure 850. For example, if the tree data structure 850 is a binary tree, the leaf node 851B is split into two leaf nodes 851B. As another example, if the tree data structure 850 is a ternary tree, the leaf node 851B is split into three leaf nodes 851B.

When a measure of activity for each of n leaf nodes 851B that result from a split falls below a pre-specified low threshold, the n leaf nodes are merged into one leaf node 851B utilizing a merge unit 753 of the system 750.

FIG. 11 illustrates an example tree data structure 850 constructed by the drone management data structure system 750, in accordance with an embodiment of the invention. The tree data structure 850 is a binary tree comprising multiple nodes 851, such as a parent node 851A ("A"), a first leaf node 851B ("B") and a second leaf node 851B ("C").

The tree data structure 850 is associated with a dimension (e.g., latitude, longitude, elevation or time). Each node 851 corresponds to an interval 852 of the associated dimension. Each dimension interval 852 is a pair of constraints that may be generally represented as (a, b], wherein a variable x satisfies (a, b] if and only if x>a and x<=b.

For example, the parent node 851A corresponds to a first time interval 852 ("Interval 1"), the first leaf node 851B corresponds to a second time interval 852 ("Interval 2"), and the second leaf node 851B corresponds to a third time interval 852 ("Interval 3").

Each node 851 that is either a parent of leaves or a leaf may have a corresponding time constraint that may be generally represented as (a or b]. This time constraint applies to a corresponding list of hash keys. In one embodiment, this time constraint is only used for 4D hash keys. We now assume only the 4D hash keys are being discussed. A variable x satisfies the constraint (a if and only if x>a. A variable x satisfies the constraint b] if and only if x<=b. When a time constraint is represented as (t where t denotes a time in the past, the time constraint is dropped. When a time constraint is represented as t] where t denotes a time in the past, the time constraint and the corresponding list of hash keys are garbage collected.

Each parent of leaf nodes or leaf node 851 has a corresponding list 853 of 4D cells that is governed by a corresponding time constraint. Each 4D cell is represented as an ordered sequence of four intervals, wherein each interval represents a dimension. 4D cells included in a list 853 that is governed by a time constraint represented as (t are only available for access after time t. 4D cells included in a list 853 that is governed by a time constraint represented as t] are only available for access at or before time t. A 4D cell is only included in a list 853 if a lock is placed on the 4D cell on behalf of a drone 50 (i.e., the 4D cell is active).

Each node 851 further comprises a pointer 854. If the node 851 is a leaf node 851B, the pointer 854 is set to NULL. If the node 851 is a parent node 851A, the pointer 854 references immediate descendants of the parent node 851A (i.e., each leaf node 851B that descends from the parent node 851A).

Figure 12:
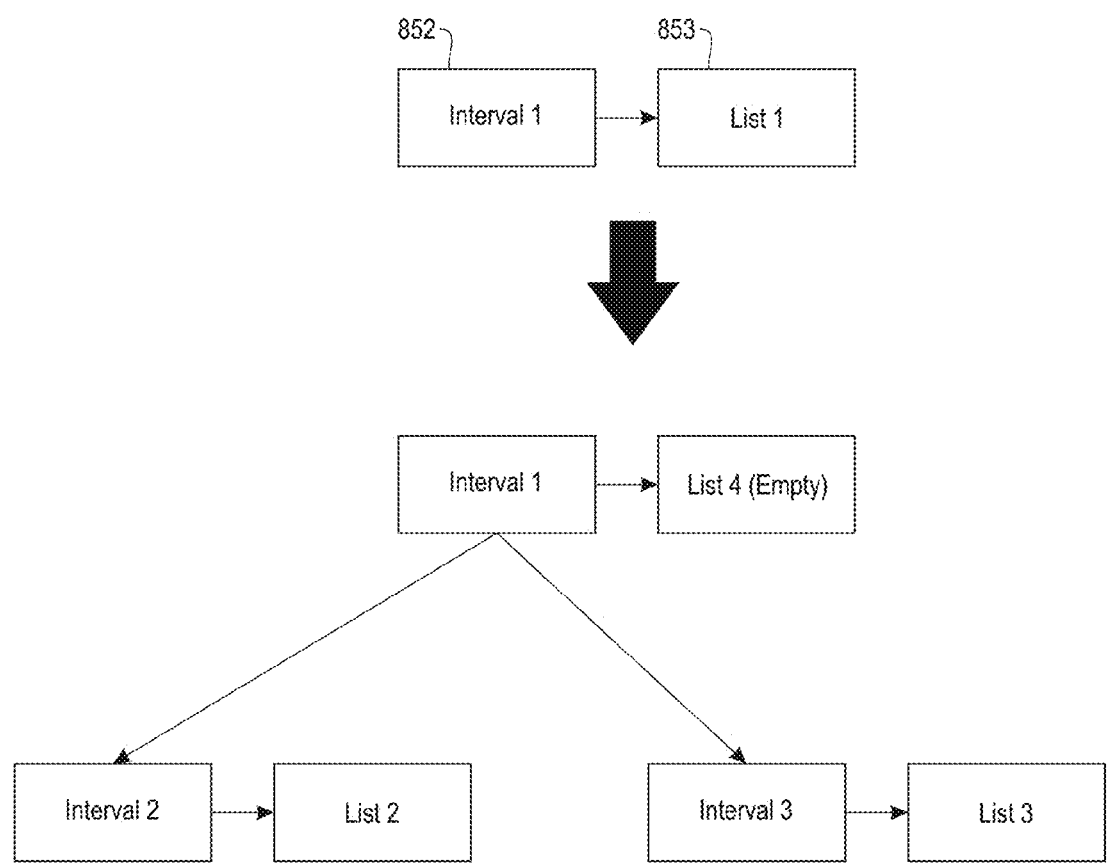
FIG. 12 illustrates an example split operation, in accordance with an embodiment of the invention.

FIG. 12 illustrates an example split operation, in accordance with an embodiment of the invention. Let Interval 1 denote a first interval 852 of, e.g., latitude, wherein Interval 1=(a, b]. Let Interval 2 denote a second latitude interval 852, wherein Interval 2=(a, c], and c=(a+b)/2. Let Interval 3 denote a third latitude interval 852, wherein Interval 3=(c, b].

Let List 1 denote a first list 853 of 4D cells with latitude interval (a,b], i.e., the interval for the dimension being split. Let List 2 denote a second list 853 with the latitude interval (a,b] replaced by (a, c] in List 1. Let List 3 denote a third list 853 with the latitude interval (a,b] replaced by (c, b] in List 1. Each 4D cell included in List 1 is split into two parts, i.e., one in List 2 and one in List 3. Let List 4 denote an empty list 853 after the split operation.

The split operation only takes place when a time constraint governing List 1 is inactive (i.e., any time expressed in the time constraint is in the past). For ease of illustration, time constraints for the nodes 851 involved are not depicted.

The hash table information corresponding to List 1 is duplicated in the corresponding entries for List 2 and List 3. Then the information corresponding to List 1 is erased and List 1 is discarded.

Figure 13:
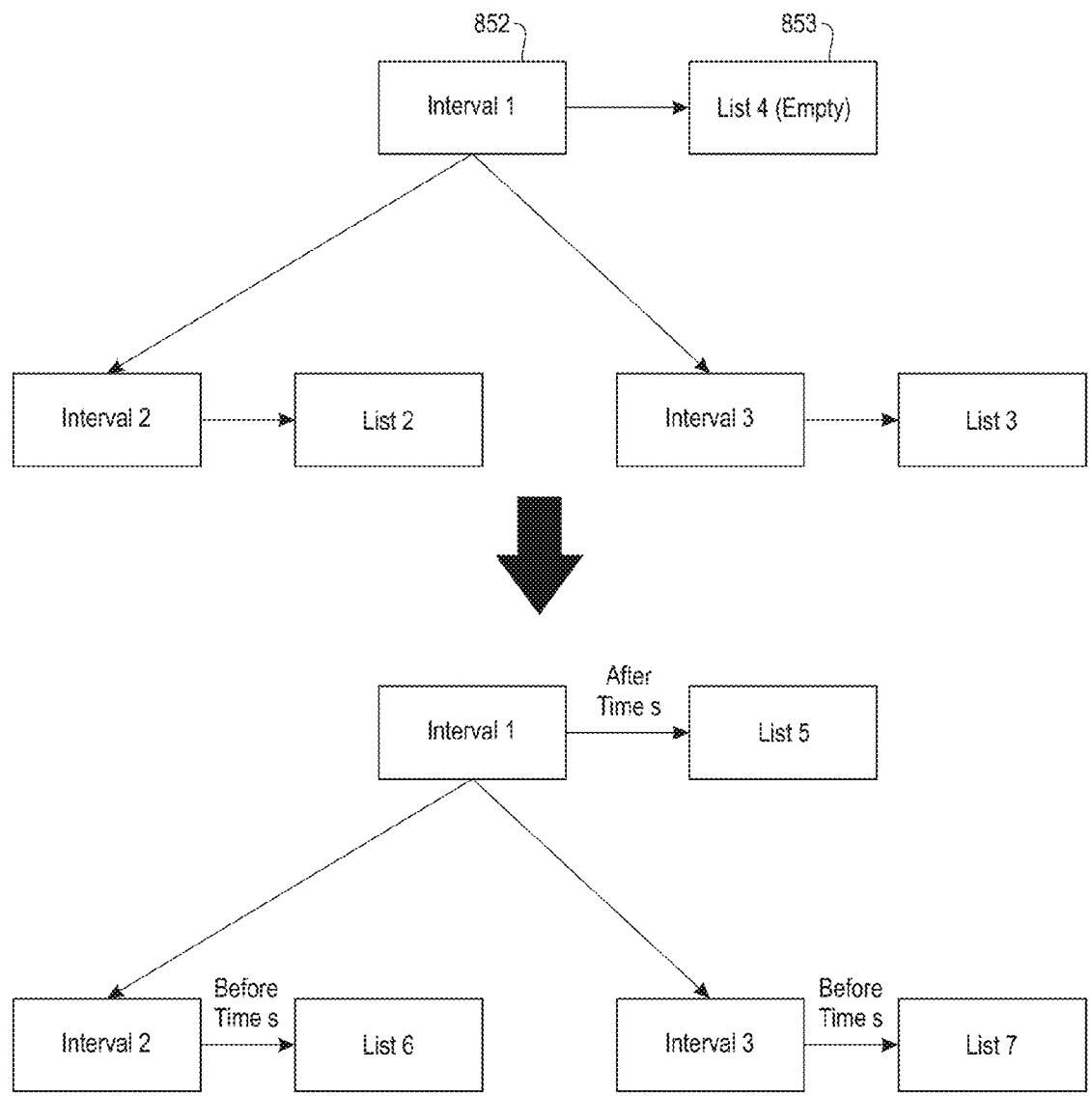
FIG. 13 illustrates an example merge operation, in accordance with an embodiment of the invention.

FIG. 13 illustrates an example merge operation, in accordance with an embodiment of the invention. Let Interval 1 denote a first latitude (for example) interval 852 for a parent node 851A (FIG. 11) with an inactive time constraint and an empty list 853 of 4D cells, wherein Interval 1=(a, b]. Let Interval 2 denote a second latitude interval 852 for a leaf node 851B with an inactive time constraint, wherein Interval 2=(a, c], and c=(a+b)/2. Let Interval 3 denote a third latitude interval 852 for a leaf node 851B (FIG. 11) with an inactive time constraint, wherein Interval 3=(c, b].

When the nodes for Interval 2 and Interval 3 are to be merged, a time interval (s, t] is selected in a tree data structure 850 associated with the time dimension tree, wherein there are no active 4D cells with time dimension >=s. Let List 6 and List 7 be lists of hash keys associated with the two nodes to be merged so that the latitude intervals are (a,c] and (c,b], respectively. The time constraint s] is placed on each of List 6 and List 7 Let List 5 be the empty list governed by (s.

At any time before time s, when a new hash key is to be constructed based on a latitude f (or a latitude interval ending in f) in (a,b] and including a time interval (d,e] with e<s, the new hash key is placed in either List1 (with latitude interval (a,c]) or List 2 (with latitude interval (c,b]), depending on whether f<=c or fc respectively, the information associated with the new hashkey being placed in the hash table.

At any time before time s when a new hash key is to be constructed based on a latitude f (or a latitude interval ending in f) in (a,b] and including a time interval (d,e] where e>=s, then the new hash key is placed in List 5 (with latitude interval (a,b]), the information associated with the new hashkey being placed in the hash table. Since e>=s, (d,e] is a time interval in the time binary tree, and (s,t] is a time interval in the time binary tree, d>=s.

When List 6 or List 7 is empty (i.e., the 4D cells have only expired data), each element of the non-empty list is converted into an element of List 5 by changing the latitude interval to (a,b]; the information associated with each hash key is removed from the hash table and copied into an entry associated with the new hash table; the leaf nodes 851B (FIG. 11) are removed; the pointer 854 (FIG. 11) is set to NULL; and the time constraint on List 5 is removed.

In case the dimension of the binary tree is time, there is an extra operation that is performed: as needed, a new root interval is created that doubles the duration of the previous root interval increasing the end point into the future, and the future half of the time binary tree is extended to the same depth as the previous half. When the previous half is all in the past, it is removed and the root is removed. In this way, the time binary tree maintains a finite partition of a finite time, always extending into the future. Intervals in this partition may be split and merged as in the case of the other dimension binary trees.

In the case of a multidimensional structure without a time dimension (e.g. a 3D structure including time-stamped weather observations or predictions in some cells), we assume that the transient information is time-stamped or has some other method for determining when the transient information has expired. In one embodiment we assume time-stamped information and allow immediate merger of cells by selecting the information with the latest time stamp or combining (for example, averaging) information from multiple cells with the same time stamp.

Table 8 below illustrates example split and merge operations involving a 3D representation of weather data with time stamp and expiration of data 10 units later than time stamp.

TABLE 8

Initially two weather observations
- at time 1 wind was observed at 20 in cell (0,100](4,8](0,4]
- at time 5 wind was observed at 10 in cell (100,200](4,8](0,4]
- Hash table
  - (0,100](4,8](0,4]→ t1,wind20
  - (100,200](4,8](0,4]→ t5,wind10
- Elevation binary tree nodes
  - (0,200] <c,none> <list,empty>
    - (0,100] <c,none> <list,((0,100](4,8](0,4])>
    - (100,200) <c,none> <list,((100,200](4,8](0,4])>

Split
- Elevation binary tree node (100,200] becomes a parent to two nodes
- Hash table
  - (0,100](4,8](0,4] → t1,wind20
  - (100,150](4,8](0,4] → t5,wind10
  - (150,200](4,8](0,4] → t5,wind10
- Elevation binary tree nodes
  - (0,200] <c,none> <list,empty>
    - (0,100] <c,none> <list,((0,100](4,8](0,4])>
    - (100,200) <c,none>
      - (100,150] <c,none> <list,((100,150](4,8](0,4])>
      - (150,200] <c,none> <list,((150,200](4,8](0,4])>

New observation and scheduled marge
- at time 10 wind was observed at 5 in cell (100,150](4,8]
- elevation binary tree leaves (100,150] and (150,200] are scheduled to merge into the parent node at time 20 when the current active data in the corresponding cells expires
- Hash table
  - (0,100](4,8](0,4] → t1,wind20
  - (100,150](4,8](0,4] → t10,wind5
  - (150,200](4,8](0,4] → t5,wind10
- Elevation binary tree nodes
  - (0,200] <c,none> <list,empty>
    - (0,100] <c,none> <list,((0,100](4,8](0,4])>
    - (100,200) <c,(10>
      - (100,150] <c,10]> <list,((100,150](4,8](0,4])>
      - (150,200] <c,10]> <list,((150,200](4,8](0,4])>

TABLE 8-continued

Empty list triggers merge
- at time 11 the data in (0,100](4,8](0,4] expires
- at time 16 the data in (150,200](4,8](0,4] expires, triggering the scheduled merge early
- Hash table
    - (100,200](4,8](0,4] → t10,wind5
- Elevation binary tree nodes
    - (0,200] <c,none> <list,empty>
        - (0,100] <c,none> <list,empty>
        - (100,200) <c,none> <list ,((100,200](4,8](0,4])>

Commercial drone management requires a system for deploying and landing drones from stationary and mobile platforms. Embodiments of the invention provide an apparatus for servicing, protecting and transporting drones (e.g., drone launch, landing, storage, and/or recharge). The apparatus may be coupled with/mounted onto a stationery installation, a moving vehicle, or a larger drone for transporting smaller drones. The apparatus may be stationary or mobile (e.g., on the ground or in the air).

In one embodiment, the apparatus comprises a standardized, modular, portable, physical device that can serve as: (1) a beacon, (2) a landing area, (3) a sheltered storage area, (4) a takeoff area, (5) a recharge facility, and/or (6) a hangar for multiple drones. In this specification, let the term "drone receiver" generally denote the standardized, modular, portable, physical device described above.

In one embodiment, the drone receiver may be mounted onto/coupled with any of the following: (1) a stationary foundation, (2) a non-stationary flat-bed ground or water vehicle (e.g., a truck, a railroad car, etc.), or (3) a larger drone capable of carrying/storing multiple smaller drones. In this specification, let the term "drone carrier" represent a drone receiver mounted onto/coupled with a larger drone capable of carrying/storing multiple smaller drones.

One embodiment relates to managing a group of drones that are associated with and/or carried/stored on a drone carrier. A moving drone receiver with several stored drones (i.e., a drone carrier) may be configured to perform pick-up and delivery services for multiple source and target locations, wherein the stored drones have short flight times constrained by small light weight batteries.

To execute coordinated pick-up and delivery or similar tasks using a mobile apparatus (e.g., a drone carrier or a drone receiver mounted to a non-stationary flat-bed ground or water vehicle) and a group of smaller drones, one embodiment applies a heuristic solution to the planar traveling salesman problem to obtain heuristic ordering and assignment of the tasks to drones.

One embodiment provides a method for landing a drone on a drone carrier while the drone carrier is in flight. Another embodiment provides a drone carrier configured to rescue disabled drones (e.g., a drone that has lost power in air). The drone carrier is capable of catching powerless drones and powered drones using shock absorbers, magnetic levitation, and/or a net.

One embodiment adapts the air traffic control and flight plan management system 200 to accommodate a moving, landing or take off area with its own flight plan.

One embodiment provides shared locks for 4D cells for group coordinated plans.

Figures 14A, 14B:
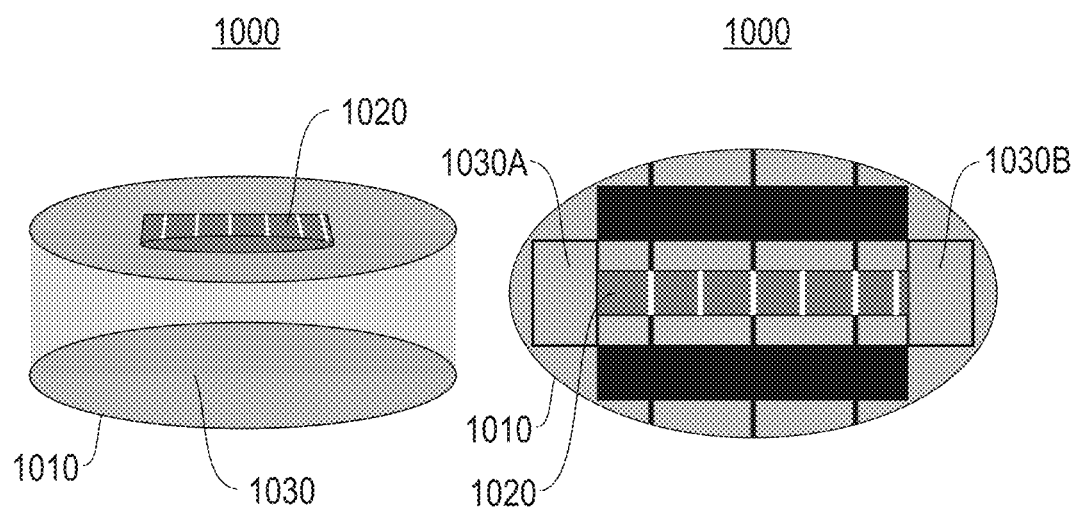
FIG. 14A illustrates an example drone receiver, in accordance with an embodiment of the invention.
FIG. 14B illustrates an example top view of the drone receiver in FIG. 14A, in accordance with an embodiment of the invention.

FIG. 14A illustrates an example drone receiver 1000, in accordance with an embodiment of the invention. FIG. 14B illustrates an example top view of the drone receiver 1000 in FIG. 14A, in accordance with an embodiment of the invention. The drone receiver 1000 comprises a body 1010. The body 1010 maintains a storage and recharge facility ("storage facility") 1030 that acts as a storage body for storing payload and/or drones. The storage facility 1030 comprises different storage locations and one or more mechanical movable arms for storing or retrieving payload and/or drones in the storage locations.

In one embodiment, the storage facility 1030 maintains charge on super capacitor for quick charge/re-charge of drone battery of the stored drones.

The drone receiver 1000 further comprises a receiver and conveyor belt 1020 supported over the storage facility 1030. The conveyor belt 1020 is large enough to receive and maintain payload and/or drones. In one embodiment, the conveyor belt 1020 has multiple sections, and each section has one or more mechanical movable arms for grasping drones and/or payload; the arms may be controlled by a landing drone or a departing drone. For example, in one example implementation, when a drone lands on the conveyor belt 1020, the drone may signal one or more arms of the conveyor belt 1020 to grasp the drone or a payload released by the drone.

In one embodiment, the conveyor belt 1020 ascends from and descends into the storage facility 1030 via a first opening 1030A and a second opening 1030B, respectively, of the body 1010. Stored payload and/or drone(s) stored in the storage facility 1030 may be retrieved and placed on a belt portion of the conveyor belt 1020 before the belt portion ascends from the storage facility 1030 via the first opening 1030A to rotate the stored payload and/or drone(s) to the top/upper surface of the drone receiver 1000. Any received payload and/or drone(s) on a belt portion of the conveyor belt 1020 may be stored in the storage facility 1030 after the belt portion descends into the storage facility 1030 via the second opening 1030B to rotate the received payload and/or drone(s) below to the storage facility 1030.

For example, after one or more arms of the conveyor belt 1020 grasp a received package (i.e., a received payload and/or drone), the conveyor belt 1020 rotates the package below to the storage facility 1030 where the arms then release the package to one or more arms of the storage facility 1030 for placement in a storage location within the storage facility 1030. To bring a stored package (i.e., a stored payload and/or drone) to the top/upper surface of the drone receiver 1000, one or more arms of the storage facility 1030 retrieve the stored package from a storage location within the storage facility 1030, and release the stored package onto the conveyor belt 1020 where one or more arms of the conveyor belt 1020 grasp the stored package as the conveyor belt 1020 rotates the stored package to the top/upper surface of the drone receiver 1000. The process of retrieving or storing a package is controlled by an extension of the high level programming language described above that is compatible with the air traffic control and flight plan management system 200. A drone may send parts of its executable flight plan to the drone receiver 1000 that executes the parts with multiple threads and synchronization.

In one embodiment, the drone receiver 1000 comprises an array of electromagnets ("electromagnet array") and provides alternating current to power the electromagnet array. As described in detail later herein, the electromagnet array may be used to slow and stabilize a falling drone that is programmed to land from above the drone receiver 1000.

In one embodiment, the drone receiver 1000 comprises mechanical retractable devices mounted at a center of drone receiver 1000. For example, the drone receiver 1000 may comprise one or more retractable shock absorbers, and provides power to extend and retract the shock absorbers. As described in detail later herein, the shock absorbers may be used to cushion the fall of a falling drone that is programmed to land from above the drone receiver 1000.

Figures 14C, 14D:
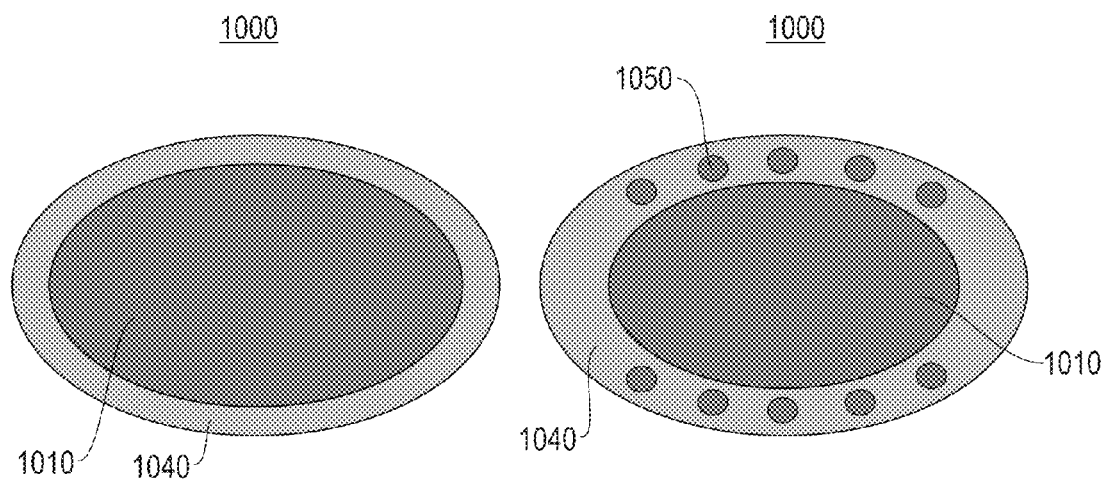
FIG. 14C illustrates an example bottom view of the drone receiver in FIG. 14A, in accordance with an embodiment of the invention.
FIG. 14D illustrates another example bottom view of the drone receiver in FIG. 14A, in accordance with an embodiment of the invention.

FIG. 14C illustrates an example bottom view of the drone receiver 1000 in FIG. 14A, in accordance with an embodiment of the invention. In one embodiment, the drone receiver 1000 may further comprise a chassis 1040 surrounding the body 1010.

FIG. 14D illustrates another example bottom view of the drone receiver 1000 in FIG. 14A, in accordance with an embodiment of the invention. In one embodiment, multiple rotor units 1050 are placed on the chassis 1040. The rotor units 1050 are spatially distributed on the chassis 1040 such that, when the rotor units 1050 are powered on, thrust power from the rotor units 1050 lift the drone receiver 1000 and provide stability.

In one embodiment, a drone may land on the drone receiver 1000 from above the drone receiver 1000. To land on the drone receiver 1000 from above the drone receiver 1000, the landing drone and the drone receiver 1000 are programmed to execute particular actions. Specifically, in one embodiment, the landing drone is programmed to power down when it is positioned over the drone receiver 1000 in the air; powering down the landing drone causes the landing drone to fall. To slow and stabilize the falling drone, the drone receiver 1000 is programmed to execute one of the following actions: (1) releasing blasts of air to slow and stabilize the falling drone, (2) utilizing diamagnetic partial levitation from an array of electromagnets powered by alternating current to slow and stabilize the falling drone, or (3) deploying one or more retractable shock absorbers to cushion the fall of the falling drone.

In one embodiment, a drone may land on the drone receiver 1000 from below the drone receiver 1000. Specifically, the drone receiver 1000 comprise a drone receiver 1000 mounted to a bottom of a large drone. Different variations of an umbrella or a net may be suspended below the drone receiver 1000. The drone receiver 1000 is programmed to use the umbrella or net to envelop, catch and retrieve a disabled drone (e.g., a drone that has lost power in air), a powered down drone (i.e., a drone programmed to power down when it is positioned below the drone receiver 1000 in the air), and a powered drone.

Figure 14E:
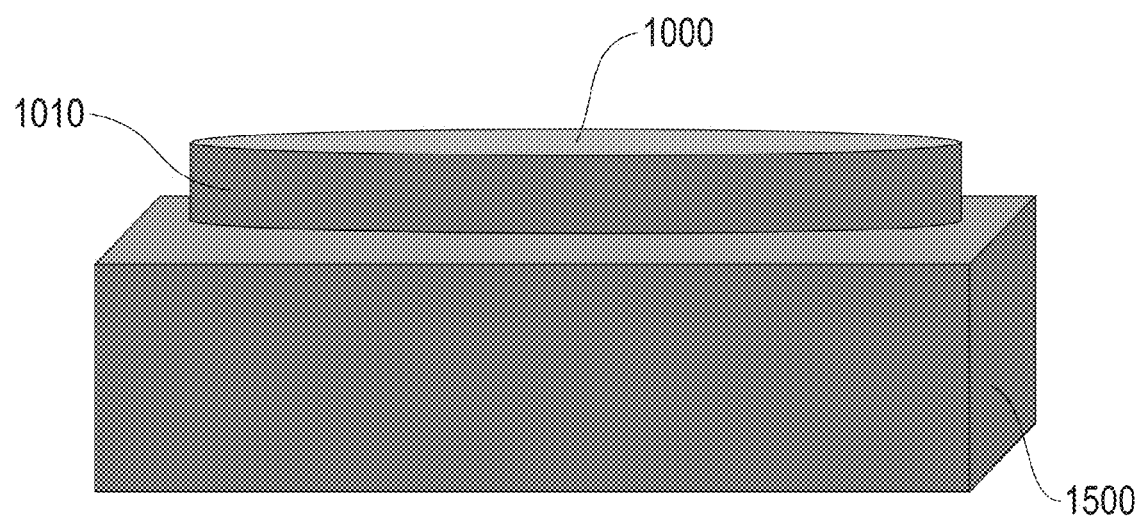
FIG. 14E illustrates an example drone receiver mounted onto/coupled with a non-stationary flat-bed ground or water vehicle, in accordance with an embodiment of the invention.

FIG. 14E illustrates an example drone receiver 1000 mounted onto/coupled with a non-stationary flat-bed ground or water vehicle 1500, in accordance with an embodiment of the invention. The vehicle 1010 may be a truck, a railroad car, a ship, etc.

Figure 15:
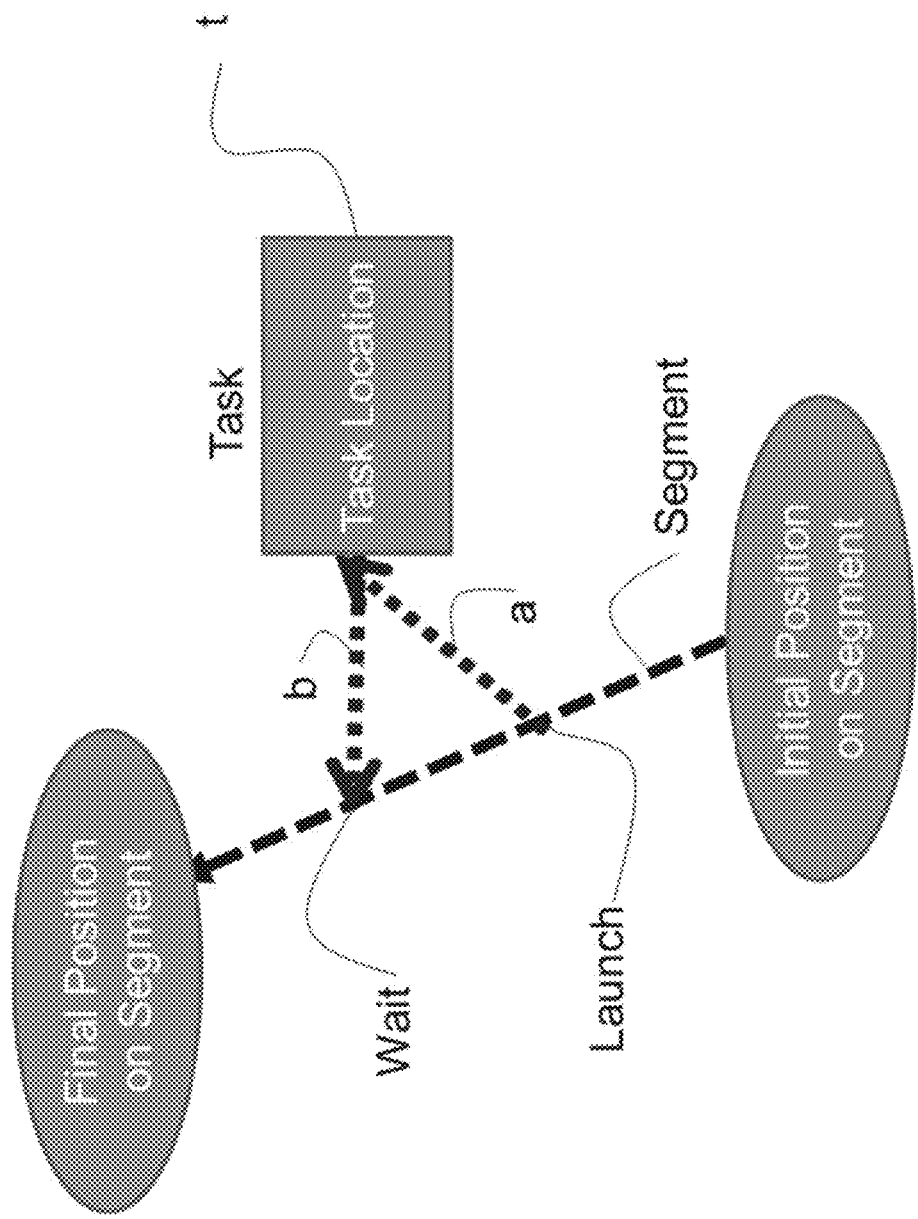
FIG. 15 illustrates a concept of feasibility, in accordance with an embodiment of the invention.

Embodiments of the invention provide for scheduling of multiple tasks based on a concept of feasibility. The concept of feasibility is based on a planned travel segment for a mobile vehicle on which a drone receiver is mounted, a task location of a task, predicted weather characteristics in the region including the travel segment and the target location, and operating characteristics of one of multiple drones carried by the drone receiver. FIG. 15 illustrates the concept of feasibility, in accordance with an embodiment of the invention. A launch point on the travel segment is feasible for the drone with respect to the task if there is a retrieve point at or later on the travel segment (i.e., in the direction of the scheduled heading of the mobile vehicle on which the drone receiver is mounted), such that the drone can travel from the launch point (e.g., segment "a" shown in FIG. 15) to the task location, perform the task, and return to the retrieve point (e.g., over segment "b" shown in FIG. 15) with a pre-specified residue of stored energy, while the drone receiver travels from the launch point to the retrieve point, and if necessary wait for the drone at the retrieve point, given predicted weather conditions in the region and battery charge for the drone.

In one embodiment, the residue of stored energy is provided by assuming that predicted wind speed in the region is always directly opposite direction of travel of the drone. If the drone is sufficiently faster than the mobile vehicle (as would likely be the case with a ground vehicle), there will be no need for the mobile vehicle to wait, and the retrieve point is plotted based on the relative speeds of the two vehicles.

In one embodiment, a travel segment is scheduled for the mobile vehicle until the mobile vehicle arrives within a feasible distance of a task location. The launch and retrieve points for a task are identical and the mobile vehicle is scheduled to wait for the drone at this point. When other task locations come within a feasible distance of points on the travel segment, these points are scheduled as launch points, and suitable retrieve points are plotted and scheduled.

Figure 16:
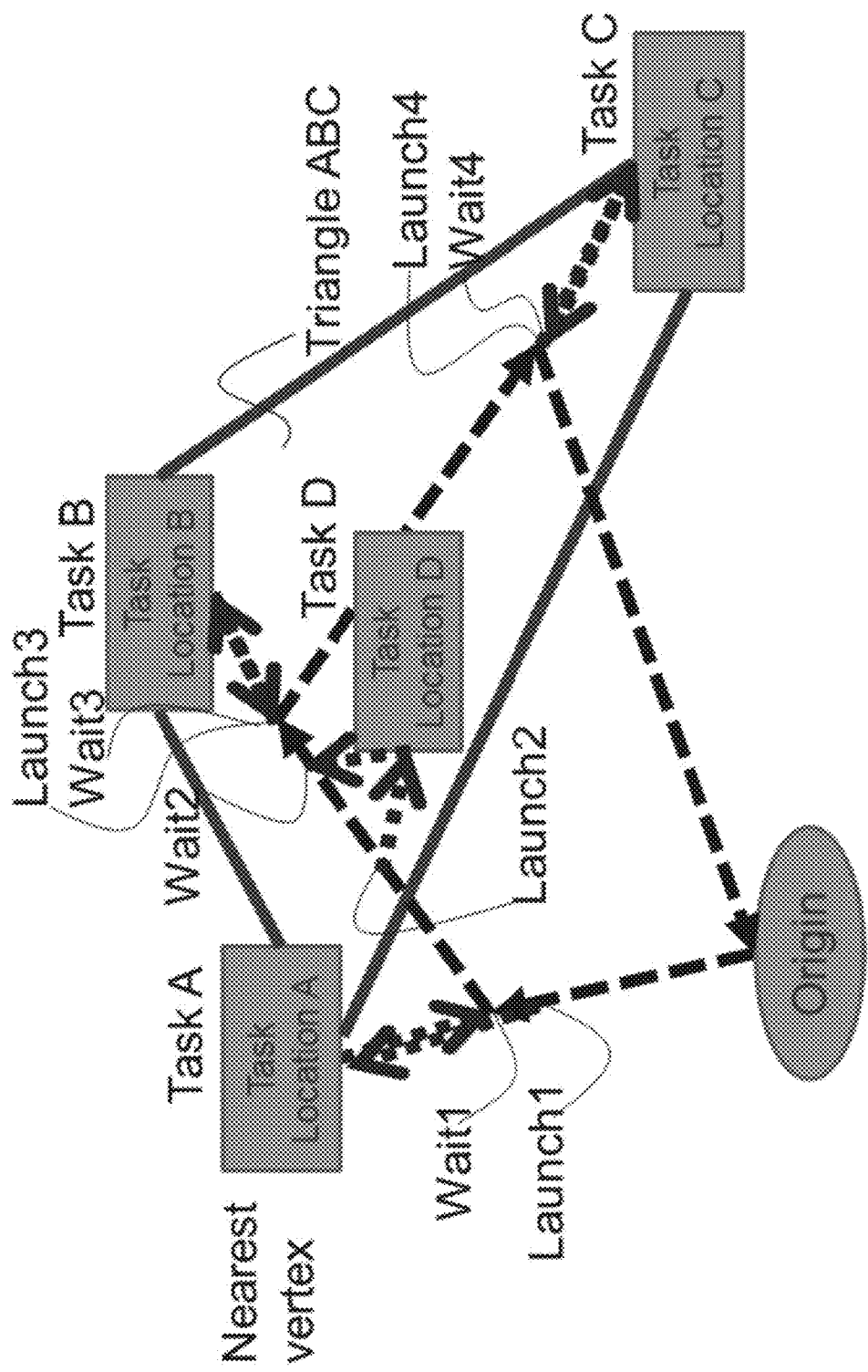
FIG. 16 illustrates an example application of a heuristic ordering of tasks based on a recursive polygonal spiral, in accordance with an embodiment of the invention.

Embodiments of the invention are configured to apply any heuristic solution to the traveling salesman problem, including applying heuristic solutions to the planar traveling salesman problem. For example, FIG. 16 illustrates an example application of a heuristic ordering of tasks based on a recursive polygonal spiral, in accordance with an embodiment of the invention. For purposes of this example, assume a drone carrier must return to its original location ("Origin") and a group of drones carried by the drone carrier are homogenous (i.e., have the same or similar operating specifications). The example shown is not limited to drone carriers; it is applicable to any type of moving drone receiver 1000 (e.g., a drone receiver 1000 mounted to a non-stationary flat-bed ground or water vehicle).

In one embodiment, the air traffic control and flight plan management system 200 is adapted to manage the drone carrier and the group of drones carried by the drone carrier. Specifically, the system 200 is configured to receive, as input, a task set comprising different tasks, wherein each task has a corresponding task target/location ("task location") associated with the task (e.g., delivering a payload to a particular location). For example, as shown in FIG. 16, the task set may comprise four different tasks with four different task locations—Task A with Task Location A, Task B with Task Location B, Task C with Task Location C, and Task D with Task Location D. The system 200 determines a convex polygon that covers all the task locations by computing a center of the task locations, passing around task locations clockwise around the center, and correcting when a vertex for a task location is no longer in a convex hull of the polygon. A polygonal spiraling inward course for the drone carrier is then constructed based on the polygon (e.g., triangle ABC between Task Locations A, B and C in FIG. 16). The different tasks are ordered by first encounter within a task feasibility distance of the drone carrier's path. Feasibility is calculated as described above. Drones are assigned in accordance with the ordering of the tasks. For example, as shown in FIG. 16, the four different task locations are initially ordered as A, B, C, D in accordance with the polygonal spiral heuristic. The actual scheduled ordering is as follows: (1) Task Location A as the first target location, (2) Task D as the second target location because Task Location D lies within a feasible distance of a segment between a retrieve point for Task A and Task B, (3) Task B as the third target location, and (4) Task C as the fourth target location. In one embodiment, a delay along a spiral path for a drone assigned to a task is planned/programmed to allow enough time for a next drone to become available for a next task (e.g., recharged sufficiently for next task). Part of the feasibility calculation includes allowing for recharging time before scheduling the launch of a drone that has already performed a task.

Figure 17:
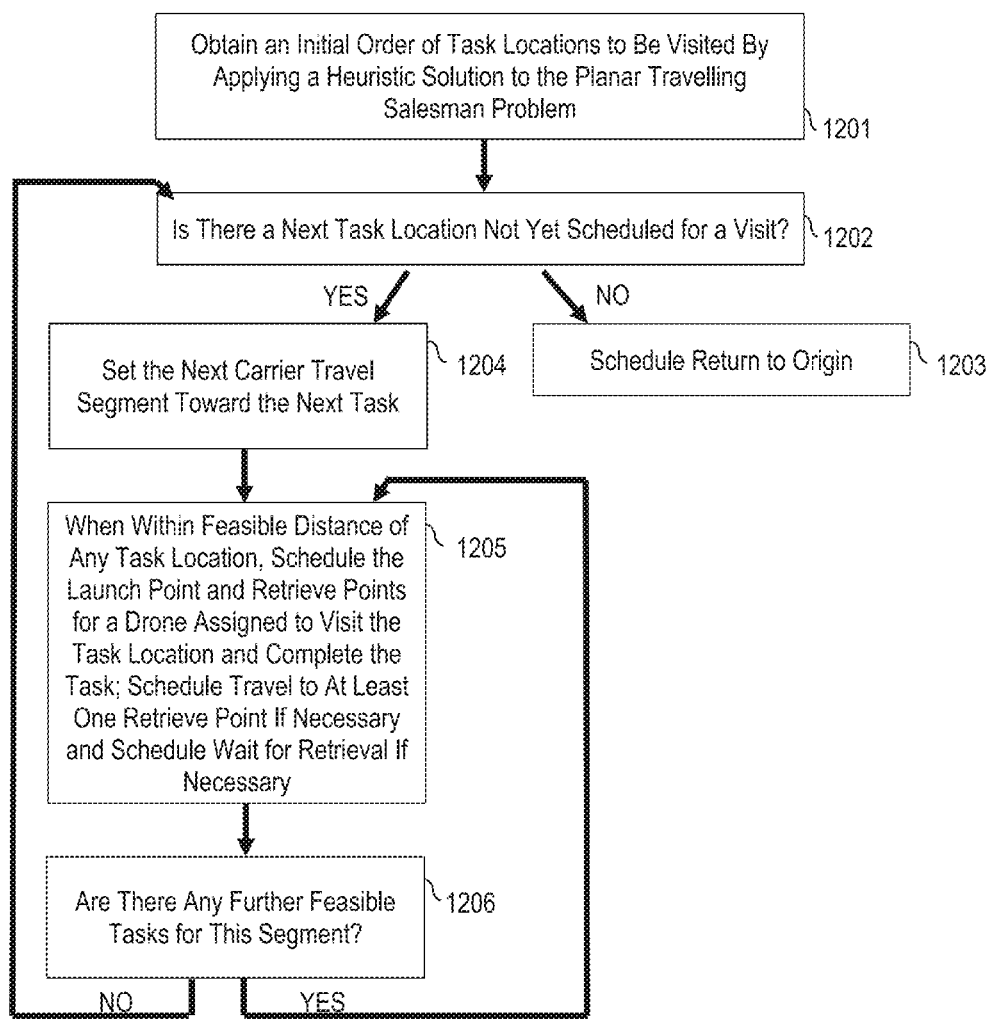
FIG. 17 illustrates a flowchart of an example process that the system implements for managing a moving drone receiver, in accordance with an embodiment of the present invention.

FIG. 17 illustrates a flowchart of an example process 1200 that the air traffic control and flight plan management system 200 implements for managing a moving drone receiver 1000, in accordance with an embodiment of the present invention. In process block 1201, obtain an initial order of task locations to be visited by applying a heuristic solution to the planar traveling salesman problem. In process block 1202, determine whether there is a next task location not yet scheduled for a visit. If there is no next task location not yet scheduled for a visit, proceed to process block 1203. In process block 1203, schedule return to the origin; the process ends after scheduling the return to the origin. If there is a next task location not yet scheduled for a visit, proceed to process block 1204.

In process block 1204, set the next carrier travel segment from the current location to the next task location (i.e., the location of the next task). In process block 1205, schedule the launch of a drone when within feasible distance of any task location in the order; also, retrieve points for the drone, schedule travel to at least one retrieve point as necessary, and schedule wait for retrieval as necessary. In process block 1206, determine whether there are any remaining tasks within feasible distance of the current segment. If there is at least one remaining task within feasible distance of the current segment, return to process block 1205.

If there are no remaining tasks within feasible distance of the current segment, return to process block 1202.

Embodiments of the invention allow 4D cells to be locked with a group lock. In one embodiment, each drone member of a group of drones is registered with its own name, a group name for the group, and its operating characteristics. Each drone receiver 1000 to be utilized with the group is also registered with its own name, the group name, and its operating characteristics (including whether the drone receiver 1000 is mobile or stationary). In one embodiment, each mobile drone receiver 1000 is configured to create an action plan and a group flight plan The system 200 receives a request for an action plan submitted on behalf of the group. The request comprises a task set comprising different tasks, wherein each task has one or more corresponding task locations and one or more task actions. Some of the task locations may be specified as a location of a drone receiver 1000 instead of specific location coordinates. Each task is intended to be performed by one drone member from the group.

The system 200 attempts to satisfy the request tentatively using a heuristic solver. If a feasible solution is found, requests for flight plans are forwarded to each zone controller 60 (FIG. 1) in which a drone member is initially located; otherwise, if not feasible solution is found, the system 200 returns the request with a notification indicating that the request is infeasible.

In one embodiment, tasks are clustered by minimum distance from drone receivers 1000.

In one embodiment, if all drone receivers 1000 utilized are stationary, each task is treated as a flight plan request, but 4D cells are still locked with a group lock. Each stationary drone receiver 1000 is configured to create a group flight plan for each of its tasks beginning with the first task, and utilizes the least powerful drone member that can be expected to perform the task (i.e., a pre-specified percentage of the time), while allowing for re-charge before reuse, and allowing a minimum requested time between launch and landing events.

In one embodiment, if there is only one mobile drone receiver 1000, tasks are ordered by maximum distance between a task location and an origin/initial location of the drone receiver 1000, and then clockwise spiraling in. For simplicity, assume all drone members are initially located at or near the drone receiver 1000. The drone receiver 1000 starts on a shortest path towards a first task location that is furthest away from the origin. The drone receiver 1000 launches a drone member when there is a feasible round trip between it and the other task locations. The drone receiver 1000 continues toward the retrieval point until it is feasible to take a course toward a second task location that is second furthest away (and still within distance to receive the first drone member launched). The drone receiver 1000 continues iteratively in this manner until all tasks are completed.

In one embodiment, if there is more than one mobile drone receiver 1000 in the group, the tasks are divided among the drone receivers 1000 proportional to the number and power of drone members that are initially located at or near each drone receiver 1000.

In some embodiments of the invention, the travel segments for the drone carrier (mobile vehicle carrying the drone receiver) are perturbed from the method described in FIGS. 16 and 17. Instead of setting the heading toward the first task target not yet scheduled for a visit, the heading is set toward a point that is on the direct path between the first and second ordered tasks (replacing the second ordered task by the origin when no second task remains without a previously scheduled visit. This point must be a feasible launch and retrieval point for the first task. In some embodiments it is always set closer to the first task than the second. If there is are earlier feasible launch and retrieval points for the first task on the segment then the earliest such are scheduled. If necessary the carrier waits at the retrieval point. The process is then repeated with a heading set toward a point on a path between the next task not yet scheduled for a visit and the next task after that. When all tasks have been scheduled, the heading is set for the origin and the carrier is scheduled to return to the origin.

Figure 18:
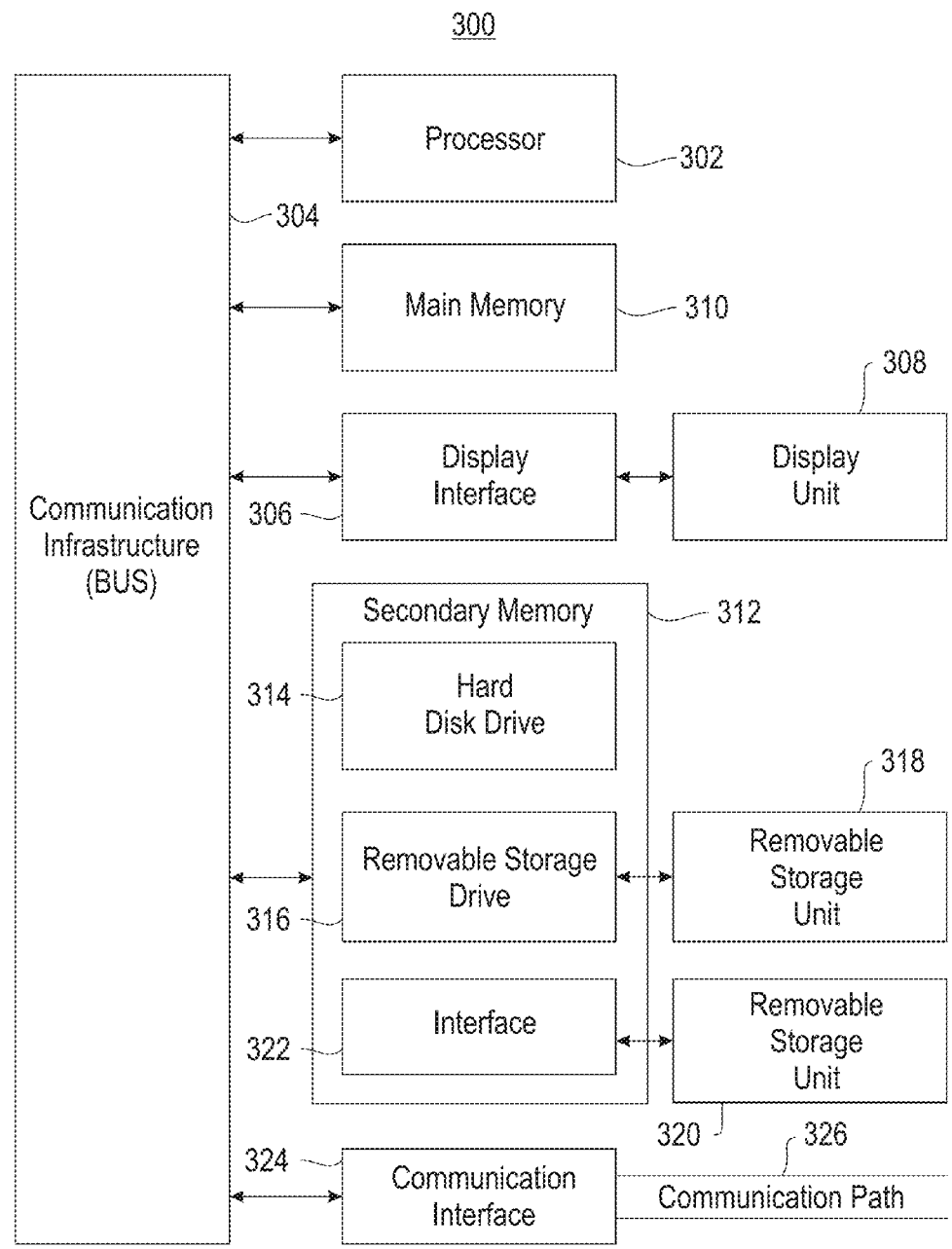
FIG. 18 is a high level block diagram showing an information processing system useful for implementing one embodiment of the invention.

FIG. 18 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving a task set comprising multiple tasks, wherein each task has a corresponding task location;
   receiving operational information identifying one or more operating characteristics of multiple drones;
   obtaining an initial heuristic ordering of the multiple tasks based on the operational information and climate information; and
   scheduling the multiple tasks to obtain a final ordering of the multiple tasks, wherein the final ordering represents an order in which the multiple tasks are scheduled, and the final ordering may be different from the initial heuristic ordering.

2. The method of claim 1, further comprising:
   for each task, receiving the climate information identifying estimated wind conditions within proximity of a corresponding task location for the task.

3. The method of claim 2, wherein:
   the initial heuristic ordering is based on a recursive polygonal spiral course for a drone receiver carrying the multiple drones; and
   for each task, the drone receiver is scheduled to approach a corresponding task location for the task to within a distance, the distance being computed based on one or more operating characteristics of a drone of the multiple drones that will be scheduled to perform the task and estimated wind conditions within proximity of the task.

4. The method of claim 3, wherein the distance is also computed based on a limiting unpowered falling velocity of the drone that will perform the task, such that the drone receiver is capable of catching the drone if the drone encounters a power failure during a horizontal move, wherein the horizontal move is performed at a pre-specified elevation above an elevation of the drone receiver.

5. The method of claim 4, wherein the drone receiver catches a drone that encounters a power failure.

6. The method of claim 5, wherein the drone receiver comprises one or more mechanical shock absorbers to facilitate catching a drone that encounters a power failure.

7. The method of claim 1, wherein:
   the initial heuristic ordering is computed by applying a heuristic, approximate solution to the planar traveling salesman problem; and
   the final ordering is a modification of the initial heuristic ordering based on scheduling the multiple tasks when they become feasible, even if out of order.

8. The method of claim 1, further comprising:
   setting a heading toward a task location corresponding to a first task of the initial heuristic ordering.

9. The method of claim 1, further comprising:
scheduling the launch of a drone of the multiple drones to perform a task when the drone is within a feasible distance of the task location independent of any initial heuristic ordering.

10. The method of claim 9, further comprising:
scheduling, when the carrier is within the feasible distance of a task location corresponding to the first task of the initial heuristic ordering, the launch of a drone of the multiple drones to perform the first task, scheduling continuing on the same heading, and, if necessary, scheduling waiting for the return of the drone, and scheduling subsequent re-setting of the heading towards another task location corresponding to another task of the initial heuristic ordering that has not already been scheduled for visit.

11. The method of claim 1, further comprising:
managing a group flight plan request for a group of drones utilizing shared locks for 4D cells for the group, and computing feasibility of the request utilizing a heuristic solution that is based on maximum distance to a location specified in a task.

12. A system comprising a computer processor, a computer-readable hardware storage medium, and program code embodied with the computer-readable hardware storage medium for execution by the computer processor to implement a method comprising:
receiving a task set comprising multiple tasks, wherein each task has a corresponding task location;
receiving operational information identifying one or more operating characteristics of multiple drones;
obtaining an initial heuristic ordering of the multiple tasks based on the operational information and climate information; and
scheduling the multiple tasks to obtain a final ordering of the multiple tasks, wherein the final ordering represents an order in which the multiple tasks are scheduled, and the final ordering may be different from the initial heuristic ordering.

13. The system of claim 12, the method further comprising:
for each task, receiving the climate information identifying estimated wind conditions within proximity of a corresponding task location for the task.

14. The system of claim 13, wherein:
the initial heuristic ordering is based on a recursive polygonal spiral course for a drone receiver carrying the multiple drones; and
for each task, the drone receiver is scheduled to approach a corresponding task location for the task to within a distance, the distance being computed based on one or more operating characteristics of a drone of the multiple drones that will be scheduled to perform the task and estimated wind conditions within proximity of the task.

15. The system of claim 12, wherein the distance is also computed based on a limiting unpowered falling velocity of the drone that will perform the task, such that the drone receiver is capable of catching the drone if the drone encounters a power failure during a horizontal move, wherein the horizontal move is performed at a pre-specified elevation above an elevation of the drone receiver.

16. The system of claim 15, wherein the drone receiver catches a drone that encounters a power failure.

17. The system of claim 12, wherein the drone receiver comprises one or more mechanical shock absorbers to facilitate catching a drone that encounters a power failure.

18. The system of claim 12, wherein:
the initial heuristic ordering is computed by applying a heuristic, approximate solution to the planar traveling salesman problem; and
the final ordering is a modification of the initial heuristic ordering based on scheduling the multiple tasks when they become feasible, even if out of order.

19. The system of claim 12, the method further comprising:
setting a heading toward a task location corresponding to a first task of the initial heuristic ordering.

20. A computer program product comprising a computer-readable hardware storage device having program code embodied therewith, the program code being executable by a computer to implement a method comprising:
receiving a task set comprising multiple tasks, wherein each task has a corresponding task location;
receiving operational information identifying one or more operating characteristics of multiple drones;
obtaining an initial heuristic ordering of the multiple tasks based on the operational information and climate information; and
scheduling the multiple tasks to obtain a final ordering of the multiple tasks, wherein the final ordering represents an order in which the multiple tasks are scheduled, and the final ordering may be different from the initial heuristic ordering.

* * * * *